US005734381A

United States Patent [19]
Yoshizawa et al.

[11] Patent Number: 5,734,381
[45] Date of Patent: Mar. 31, 1998

[54] CANCEL UNDO METHOD AND SYSTEM FOR TREE STRUCTURE DATA EDITION BASED ON HIERARCHICAL MENU INQUIRY

[75] Inventors: Masaharu Yoshizawa; Tetsuro Nishida; Hirohisa Yamamoto; Katsuki Satozaki, all of Tokyo, Japan

[73] Assignee: NEC Corporation, Tokyo, Japan

[21] Appl. No.: 576,369

[22] Filed: Dec. 21, 1995

[30] Foreign Application Priority Data

Dec. 21, 1994 [JP] Japan .................................. 6-318806

[51] Int. Cl.$^6$ ....................................... G06F 15/00
[52] U.S. Cl. .............................. 345/352; 345/353
[58] Field of Search ........................ 395/352, 353, 395/356, 357, 335, 333, 339, 115, 326

[56] References Cited

U.S. PATENT DOCUMENTS

| | | | |
|---|---|---|---|
| 5,347,632 | 9/1994 | Filepp et al. | 395/200 |
| 5,485,175 | 1/1996 | Suzuki | 395/352 |
| 5,546,522 | 8/1996 | Nishida et al. | 395/350 |
| 5,557,722 | 9/1996 | DeRose et al. | 395/352 |
| 5,559,945 | 9/1996 | Beaudet et al. | 395/352 |
| 5,581,685 | 12/1996 | Sakurai | 395/353 |
| 5,621,905 | 4/1997 | Jewson et al. | 395/353 |

Primary Examiner—Raymond J. Bayerl
Assistant Examiner—Steven P. Sax
Attorney, Agent, or Firm—Foley & Lardner

[57] ABSTRACT

The invention provides a cancel/undo method and system wherein the undo data amount upon changing of a tree structure is compressed and a cancel operation and an undo operation are united to significantly reduce the memory consumption and the processing time. A cancel data list and a undo data list are prepared, and undo data are classified into cancel type undo data and uncancel type undo data. Changed content information of tree structure data includes differential information of a changing object node position and a lower hierarchy side tree structure of the changing object node. Upon do operation, contents of the change are added as cancel data to the cancel data list while a cancel type is added to the undo data list. When cancel type data is object data of a cancel operation or an undo operation, a tree structure is restored with the last data of the cancel data list, and the data and contents of the change by the operation are added to the undo data list. When data of the uncancel data is object data of an undo operation, the tree structure and the cancel data are restored with the data of the uncancel type.

3 Claims, 27 Drawing Sheets

CANCEL UNDO METHOD AND SYSTEM FOR TREE STRUCTURE DATA EDITION BASED ON HIERARCHICAL MENU INQUIRY

BACKGROUND OF THE INVENTION

1. Field of the Invention

This invention relates to a cancel/undo method and system for editing of tree structure data by hierarchical menu inquiries, and more particularly to a restoration method and a restoration system for restoring, in a hierarchical menu inquiry data edition system which has a plurality of unit data whose hierarchical connection conditions between them including selection by a user are defined and includes a menu inquiry apparatus for displaying a menu of objects of selection and inputting a result of selection by a user and wherein those of the plurality of unit data which make objects of selection of connection to a unit data for editing beginning with the uppermost hierarchy unit data in accordance with connection conditions are displayed in the form of a menu and are successively connected in accordance with results of selection by a user to dynamically edit aggregate data of a tree structure (tree structure data) in which each unit data serves as a node, the tree structure data changed by selection or setting upon menu inquiry to the original tree structure data.

2. Description of the Related Art

A hierarchical menu inquiry data edition system of the type mentioned is formed from a computer system and has a plurality of unit data (definition describing data) whose corresponding relationship to component information pieces, which make components of hierarchically structured information assembled by menu inquiries such as controlling software for an electronic automatic exchange, and whose connection conditions between them are defined in advance, and a menu inquiry apparatus which realizes an inquiry by displaying a menu of objects of selection on a display unit and inputting a result of selection by a user using an inputting apparatus such as a keyboard or a mouse. The hierarchical menu inquiry data edition system displays, in the form of a menu, those of the plurality of unit data which make objects of selection of connection to a unit data for edition beginning with the uppermost hierarchy unit data in accordance with connection conditions, and successively connects the unit data in accordance with results of selection by a user to dynamically edit tree structure data in which each unit data serves as a node, and then assembles corresponding component information pieces in accordance with the tree structure data to obtain desired hierarchically structured information.

The unit data (definition describing data) may have several different types including a structure type which defines a structure of a directly lower hierarchy, designates in advance a plurality of unit data to be connected fixedly and successively gives a menu inquiry in connection with the unit data, an alternative selection type which designates in advance a plurality of selectively connectable unit data as a directly lower hierarchy and causes one of the unit data to be selected in response to a menu inquiry, a field type which is connected only from an upper hierarchy, performs a menu inquiry and receives an input by a user as a value, and a citation type which is connected only from an upper hierarchy and has a preset value without performing a menu inquiry.

In order to help understanding of an editing operation of hierarchically structured information based on such tree structure data, setting of information of how to spend a holiday will be described below as an example. Examples of the unit data in this instance, that is, the definition describing data, are such as follows:

---

```
%all = struct {%sub0 %sub1}
        format {"I %t %t in the next holiday." %[0], %[1]}
%sub0 = oneOf {%sub00 %sub01 %sub02}
        message {"please select what to do"}
        menuText "work; play; stay at home"
%sub00 = "company"
        format {"go to company"}
%sub01 = struct {%sub010 %sub011}
        format {"%t %t" %[0], %[1]}
%sub010 = oneOf {%sub0100 %sub0101}
        message {"please select where to go"}
        menuText "to the sea; to the mountain"
%sub0100 = "sea"
        format {"go to the sea"}
%sub0101 = "mountain"
        format {"go to the mountain"}
%sub011 = oneOf {%sub0110 %sub0111 %sub0112}
        message {"please select with whom to go"}
        menuText "alone; family; friend"
%sub0110 = "alone"
        format {"alone"}
%sub0111 = "family"
        format {"with family"}
%sub0112 = "friend"
        format {"with friend"}
%sub02 = oneOf {%sub020 %sub021}
        format {"%t at home" %$. down}
        message {"please select what to do"}
        menuText "read a book; watch TV"
%sub020 = "book"
        format {"read a book"}
%sub021 = "TV"
        format {"watch TV"}
%sub1 = oneOf {%sub10 %sub11 %sub12}
        message {"please select traffic means"}
        menuText "none; car; train"
        where {switch (%$. up[0]. down. class)
                {case %sub00: candidate (train); break;
                 case %sub01: candidate (car, train); break;
                 case %sub02: candidate (none); break;}
              }
%sub10 = empty
%sub11 = "car"
        format {"by car"}
%sub12 = "train"
        format {"by train"}
```

---

Here, the definition describing data %all is in the uppermost hierarchy and defines the entire structure of information of how to spend a holiday. The definition describing data %all is data of the structure type (struct type) wherein it has two definition describing data %sub0 and %sub1 fixedly as a lower hierarchy. The format part of the definition describing data %all is a part which defines a conversion format to hierarchically structured information and can be provided commonly between the different types. The definition describing data %sub0 is data of the alternative selection type (oneOf type) which has three objects of selection including the definition describing data %sub00, %sub01 and %sub02. The message part of the definition describing data %sub0 is a part which designates a message indicating an item or method of selection for a menu display, and the menuText part is a part which designates display texts of objects of selection upon menu display. In particular, on a menu screen of the definition describing data %sub0, "please select what to do" is displayed as an indication message, and "work", "play" and "stay at home" are displayed as display texts of objects of selection. Also the definition describing data %sub1 is data of the alternative selection type similarly, but indicates, by its where part, that it provides different branches depending upon a result of selection at another definition describing data (in this instance, %sub0). In particular, when the definition describing data %sub00 has been selected, "train" is selected automatically, but when the definition describing data %sub01 has been selected, "car" is automatically selected, but otherwise when the definition describing data %sub02 has been selected, "none" is selected automatically. Further, the definition describing data %sub00 is data of the excitation type, and has a preset value (company) and is associated with the component information piece "go to company".

It is assumed that definition describing data are successively connected in accordance with connection conditions by way of menu selection beginning with the uppermost definition describing data %all to obtain a tree structure shown in FIG. 2(a). Here, if the result of selection on the menu screen of the definition describing data %sub0 is changed from "play" (%sub01) to "work" (%sub00), the definition describing data %sub12 is automatically selected at the definition describing data %sub1, and the tree structure is changed to that shown in FIG. 2(b). In this instance, the information of how to spend the holiday is "I go to company by train in the next holiday.". On the other hand, if the result of selection on the menu screen of the definition describing data %sub0 is changed to "stay at home" (%sub02), then the tree structure is changed to such as shown in FIG. 2(c), and the menu of the definition describing data %sub02 ("read a book", "watch TV") is displayed. If "read a book" (%sub020) is selected, then the definition describing data %sub12 is automatically selected at the definition describing data %sub1, and consequently, the tree structure is changed to that shown in FIG. 20(d). The information of how to spend the holiday then is "I read a book at home in the next holiday."

In editing different unit data into tree structure data in which each of the tree structure data is used as a node using such a hierarchical menu inquiry data edition system, in connection with an operation (do operation) of changing tree structure data by selection or setting of a menu at a certain node (change, addition or deletion of a lower node or the like) and displaying a menu for a lower node or a node of another next branch (in the same hierarchy), an operation of changing the tree structure data displayed for a node changed last back to the last tree structure data and displaying a menu for the node of the last tree structure data is called "undo", and an operation of changing the tree structure data back to tree structure data of an upper hierarchy node or a node of a directly preceding branch in the same hierarchy and displaying a menu of the node is called "cancel".

For the restoring method of tree structure data by a conventional hierarchical menu inquiry data edition system, either a method of performing only an undo operation or another method of performing only a cancel operation is normally taken. In particular, when an operation (replacement, addition or deletion) different from the last operation is performed at any node, entire tree structure data are stored into an undo data/cancel data storage area of a memory (an undo data list and a cancel data list), and when an undo operation/cancel operation is to be executed, the tree structure data stored in the undo data/cancel data storage area are copied to restore the tree structure data. On the other hand, when to perform both of a cancel operation and an undo operation, an undo data list is produced, and the tree structure data are restored to that at a location up to which data should be cancelled using the undo data list.

Here, the restoring method by an undo operation will be described. More particularly, description will be given of, for example, a sequence of operations wherein, for tree structure data (hereinafter referred to as tree structure) 11 shown in FIG. 3(a), (1) the node E is changed for (replaced with) the node F, (2) the node C is changed for (replaced with) the node G, (3) an undo operation (to change the node G back for the node C) is performed, and (4) an undo operation (to change the node F back for the node E) is performed so that the tree structure successively changes from the tree structure 11 (FIG. 3(a)) to another tree structure 12 (FIG. 3(b)), a further tree structure 13 (FIG. 3(c)), the tree structure 12 and the tree structure 11, respectively.

First, if the node E125 is changed for the node F126, then the entire tree structure is changed to the tree structure 12 of FIG. 3(b). In this instance, the undo data 41 (entire tree structure) of FIG. 21(a) are stored into an undo data storage area 90. The stored data of the undo data storage area 90 are such as illustrated in FIG. 22. Then, if the node C128 is changed for the node G127, the entire tree structure is changed to the tree structure 13 of FIG. 3(c). Also in this instance, undo data 42 (the entire tree structure) of FIG. 41(b) are stored into the undo data storage area 0. If an undo operation to change the node G127 back for the node C123 is performed, then the entire tree structure is restored to the last tree structure 12 with the uppermost undo data 42 of the undo data storage area 90. Also in this instance, undo data 43 (the entire tree structure) of FIG. 21(c) are stored into the undo data storage area 90. The stored data of the undo data storage area 90 are such as illustrated in FIG. 24. Subsequently, if an undo operation of changing the node F126 back for the node E125 is performed, then since this means that an undo operation is performed successively twice, the entire tree structure is restored to the tree structure 11 with the second last undo data 41 shown in FIG. 24. Also in this instance, the undo data 42 (entire tree structure) of FIG. 21(b) are stored into the undo data storage area 90 similarly. The stored data of the undo data storage area 90 are such as illustrated in FIG. 25.

In the restoring method for tree structure data by a conventional hierarchical menu inquiry data edition system, since, to perform only an undo operation as well as when to perform only a cancel operation, an entire tree structure is copied and then restored based on the copy each time the tree structure is changed, the two tree structures of the same contents are present in the memory, and consequently, the amount of the memory used increases as much and the memory is used wastefully. Consequently, where the memory capacity is limited, also the allowable range of undo operations and/or cancel operations (the number of times of retroactively changeable node changing) is limited. Further, as the amount of tree structure data increases, the time required for copying and the time for restoration are increased significantly as much.

Similar problems are involved also where both of a cancel operation and an undo operation are performed. Further, since tree structures are successively restored in accordance with an undo data list until a first node to be canceled is reached, much time is required for the restoration. Further, since all undo data after starting of edition must be left in order to allow a cancel operation, a great amount of the memory capacity is sometimes used wastefully.

SUMMARY OF THE INVENTION

It is an object of the present invention to provide a cancel/undo method and system wherein the undo data amount upon changing of a tree structure is reduced and a cancel operation and an undo operation are united to significantly reduce the memory consumption and the processing time.

In order to attain the object described above, according to an aspect of the present invention, there is provided an undo method for restoring, in a hierarchical menu inquiry data edition system which has a plurality of unit data whose hierarchical connection conditions between them are defined and includes menu inquiry means for displaying a menu of objects of selection and/or setting by a user and accepting a response of the user, tree structure data construction means for successively determining and connecting those of the plurality of unit data to be connected in accordance with corresponding ones of the connection conditions beginning with an uppermost one of the plurality of unit data in response to responses of the user accepted by way of the menu inquiry means to dynamically construct tree structure data wherein each of the unit data serves as a node of the tree structure, and a memory for storing data, a tree structure changed by a change of any of the nodes, the undo method comprising the steps of producing, when a changing operation is performed for an object one of the nodes for changing and the tree structure is changed, undo data including information of a relative position of the changing object node on the tree structure, a partial tree structure including the changing object node and those of the nodes which belong to the changing object node, and a type of an operation reverse to that of a changing operation performed for the changing object node and storing the thus produced undo data into the memory, reading out, when an undo operation is to be performed, the undo data stored in the memory, and restoring the tree structure based on the thus read out undo data.

According to another aspect of the present invention, there is provided a cancel/undo method for restoring, in a hierarchical menu inquiry data edition system which has a plurality of unit data whose hierarchical connection conditions between them are defined and includes menu inquiry means for displaying a menu of objects of selection and/or setting by a user and accepting a response of the user, tree structure data construction means for successively determining and connecting those of the plurality of unit data to be connected in accordance with corresponding ones of the connection conditions beginning with an uppermost one of the plurality of unit data in response to responses of the user accepted by way of the menu inquiry means to dynamically construct tree structure data wherein each of the unit data serves as a node of the tree structure, and a memory for storing data, a tree structure changed by a change of any of the nodes, the undo method comprising the steps of preparing a cancel data list for storing cancel data and an undo data list for storing undo data in the memory in advance and determining to provide, for each of the undo data, an identifier for identifying whether the undo data is of a cancel type or of an uncancel type, producing, upon do operation of changing a tree structure by selection or setting of a menu for any of the nodes and displaying a menu for a node of a lower hierarchy or a node of a next branch in the same hierarchy, cancel data including information of a restoration destination node position and a partial tree structure before the change, adding the cancel data to the last end of the cancel data list and adding cancel type undo data to the last end of the undo data list, disconnecting, upon cancel operation of restoring a tree structure for an upper hierarchy node or a node of a preceding branch on the same hierarchy, the last cancel data from the cancel data list, restoring the tree structure to that before the change based on the thus disconnected cancel data, producing uncancel type undo data including information of the cancel data disconnected from the cancel data list and a partial tree structure changed by the cancel operation as undo data for the cancel operation, and adding the uncancel type undo data to the last end of the undo data list, discriminating, upon undo operation of restoring the tree structure to that of a node changed last, whether the undo operation has been performed immediately subsequently to the last undo operation, and reading out, when the last operation is not an undo operation, the last undo data of the undo data list, but reading out, when also the last operation is an undo operation, the undo data just prior to the undo data read out upon the last undo operation of the undo data list, and discriminating a type of the thus read out undo data based on the identifier of the undo data, performing the same processing as the processing performed upon the cancel operation when the read out undo data is cancel type undo data, but restoring the tree structure based on the information when the read out undo data is uncancel type undo data, returning the cancel data disconnected from the cancel data list to the cancel data list, and adding the cancel type undo data as undo data corresponding to the undo operation to the last end of the undo data list.

According to a further aspect of the present invention, there is provided a hierarchical menu inquiry data edition system, comprising a memory for storing data including a plurality of unit data whose hierarchical connection conditions between them are defined, menu inquiry means for displaying a menu of objects of selection and/or setting by a user and accepting a response of the user, tree structure data construction means for successively determining and connecting those of the plurality of unit data to be connected in accordance with corresponding ones of the connection conditions beginning with an uppermost one of the plurality of unit data in response to responses of the user accepted by way of the menu inquiry means to dynamically construct tree structure data wherein each of the unit data serves as a node of the tree structure, the hierarchical menu inquiry data edition system being operable to restore a tree structure changed by a change of any of the nodes, the memory having a cancel data list for storing cancel data and an undo data list for storing undo data, do processing means operable under the control of the menu inquiry means for producing, when a do operation of changing a tree structure by selection or setting of a menu for any of the nodes and displaying a menu for a node of a lower hierarchy or a node of a next branch in the same hierarchy, cancel data including information of a restoration destination node position and a partial tree structure before the change, adding the cancel data to the last end of the cancel data list and adding cancel type undo data having an identifier indicative of a cancel type to the last end of the undo data list, cancel processing means operable under the control of the menu inquiry means for disconnecting, when a cancel operation of restoring a tree structure for an upper hierarchy node or a node of a preceding branch on the same hierarchy is detected, the last cancel data from the cancel data list, restoring the tree structure to that before the change based on the thus disconnected cancel data, producing uncancel type undo data including information of the cancel data disconnected from the cancel data list and a partial tree structure changed by the cancel operation as undo data for the cancel operation and having an identifier indicating the uncancel type, and adding the thus produced uncancel type undo data to the last end of the undo data list, and undo processing means operable under the control of the menu inquiry means for discriminating, when an undo operation of restoring the tree structure to that for a node changed last, whether the undo operation has been performed immediately subsequently to the last undo operation, reading out, when the last operation is not an undo operation, the last undo data of the undo data list, but reading out, when also the last operation is an undo operation, the undo data just prior to the undo data read out upon the last undo operation of the undo data list, discriminating a type of the thus read out undo data based on the identifier of the undo data, performing the same processing as the processing performed upon the cancel operation when the read out undo data is cancel type undo data, but restoring the tree structure based on the information when the read out undo data is uncancel type undo data, returning the cancel data disconnected from the cancel data list to the cancel data list, and adding the cancel type undo data as undo data corresponding to the undo operation to the last end of the undo data list.

With the undo method, the cancel/undo method and the hierarchical menu inquiry data edition system of the present invention, in order to perform an undo operation of restoring, in the hierarchical menu inquiry data edition system which dynamically edits tree structure data wherein each of a plurality of unit data serves as a node of the tree structure, a tree structure changed by a change of any of the nodes, when a changing operation is performed for an object one of the nodes for changing and the tree structure is changed, undo data including information of a relative position of the changing object node on the tree structure, a partial tree structure including the changing object node and those of the nodes which belong to the changing object node, and a type of an operation reverse to that of a changing operation performed for the changing object node are produced. Thus, when compared with conventional methods (which are based on copying of an entire tree structure), the amount of undo data can be compressed remarkably. Consequently, as the amount of tree structure data increases, the time required to store the undo data into the memory and the time required, when an undo operation is performed, to read out the undo data from the memory and restore the original tree structure can be reduced as much. Further, also the memory consumption can be reduced and the available range of an undo operation can be increased.

Further, where both of a cancel operation and an undo operation are to be performed, while the cancel data list and the undo data list are provided separately from each other, two type of undo data including cancel undo type data and uncancel type undo data are provided such that both of the cancel data and the uncancel type undo data include information of a restoration destination node position and a partial tree structure before the change so that they are used commonly and the data amount is compressed remarkably. Consequently, the processing time and the memory consumption can be reduced remarkably comparing with those of conventional methods, and also the available range of an undo operation and a cancel operation can be expanded.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIGS. 2(a), 2(b), 2(c) and 20(d) are diagrammatic views of tree structures illustrating operation of the hierarchical menu inquiry data editing system;

DESCRIPTION OF THE PREFERRED EMBODIMENT

Figure 1A:
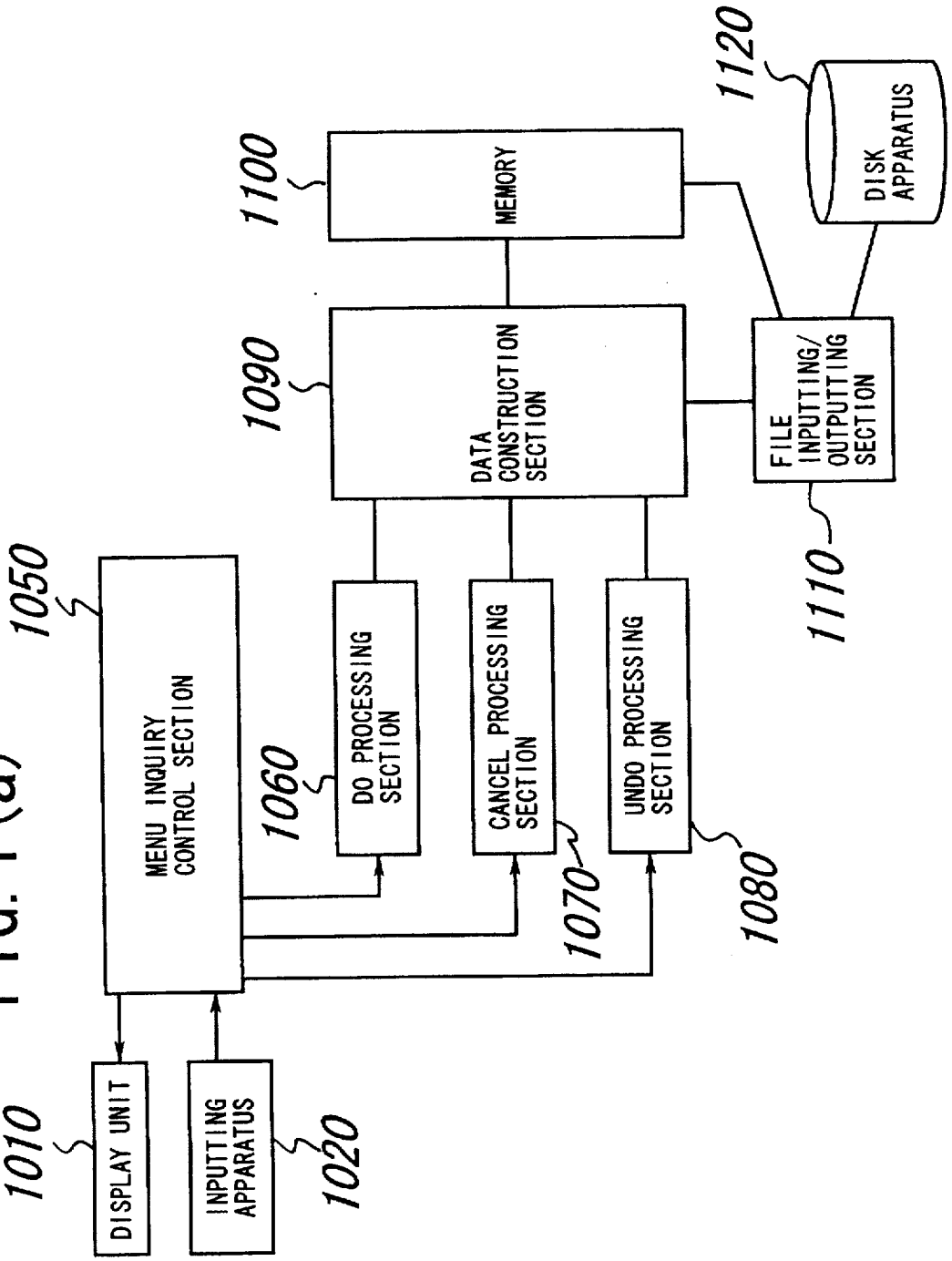
FIG. 1(a) is a block diagram of a hierarchical menu inquiry data editing system showing a preferred embodiment of the present invention.

Referring first to FIG. 1(a), there is shown a hierarchical menu inquiry data edition system according to a preferred embodiment of the present invention. The system is formed from a computer system for which such processing functions as hereinafter described are provided additionally. The system includes a display unit 1010, an inputting apparatus 1020, a menu inquiry control section 1050, a do processing section 1060, a cancel processing section 1070, an undo processing section 1080, a data construction section 1090, a memory 1100, a file inputting/outputting section 1110 and a disk apparatus 1120. However, when no cancel processing is required, the cancel processing section 1070 may be omitted.

The data construction section 1090 controls the file inputting/outputting section 1110 to transfer various data such as unit data and information necessary for assembly of tree structure data, assembled tree structure data and so forth between the disk apparatus 1120 and the memory 1100, and assembles tree structure data under the control of the menu inquiry control section 1050. The menu inquiry control section 1050 controls the display unit 1010 to display a menu corresponding to a node in accordance with a process of edition of tree structure data of the data construction section 1090. Operation information such as selection, change or setting of a menu by a user is inputted by way of the inputting apparatus 1020 to the menu inquiry control section 1050, and the do processing section 1060, the cancel processing section 1070, the undo processing section 1080 and the data construction section 1090 are activated in accordance with contents of the operation. The do processing section 1060, the cancel processing section 1070 and the undo processing section 1080 perform do processing, cancel processing and undo processing of tree structure data in the memory 1100 by way of the data construction section 1090, and the menu inquiry control section 1050 controls displaying of a menu of a new node.

Figure 1B:
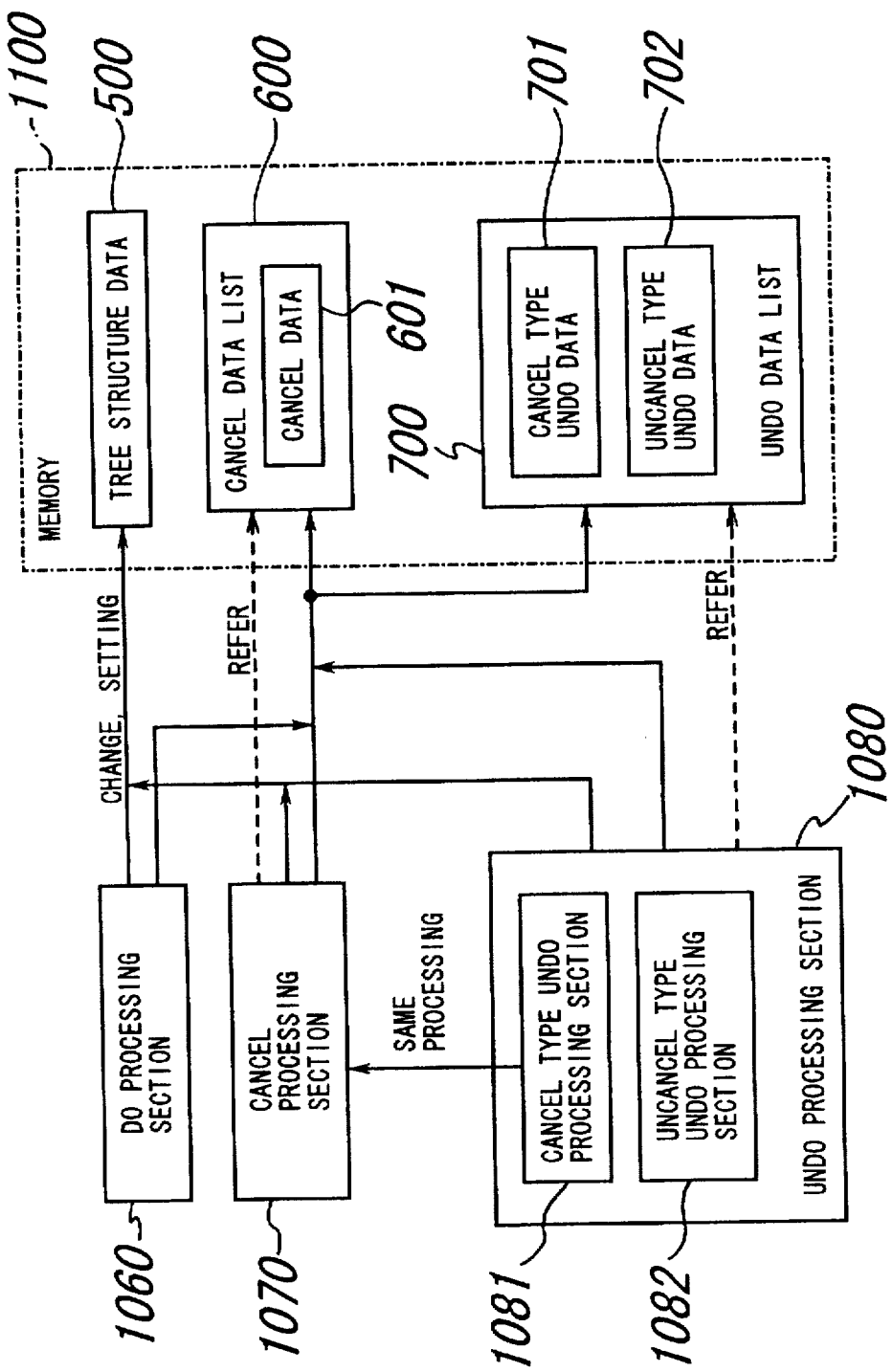
FIG. 1(b) is a block diagram illustrating a manner in which tree structure data, cancel data and undo data are controlled in the hierarchical menu inquiry data edition system shown in FIG. 1(a)

FIG. 1(b) illustrates a manner in which tree structure data, cancel data and undo data are controlled by the do processing section 1060, the cancel processing section 1070 and the undo processing section 1080. Referring to FIG. 1(b), the memory 1100 has tree structure data 500, a cancel data list 600 for storing cancel data 601, and an undo data list 700 for storing cancel type undo data 701 and uncancel type undo data 702. The undo processing section 1080 includes a cancel type undo processing section 1081 for performing processing of cancel type undo data (the same as processing of the cancel processing section 1070), and an uncancel type undo processing section 1082 for performing processing of uncancel type undo data.

First, a form of an undo method according to the present invention will be described.

Necessary data and information such as unit data, tree structure data and undo data are stored into the memory 1100, and a menu corresponding to a node is displayed on the display unit 1010 under the control of the menu inquiry control section 1050. Further, a do operation or an undo operation by a user such as selection, change or setting of a menu is performed by way of the inputting apparatus 1020. Do processing and undo processing of data in the memory 1100 are performed by the do processing section 1060 and the undo processing section 1080, respectively, by way of the data construction section 1090.

Figure 2:
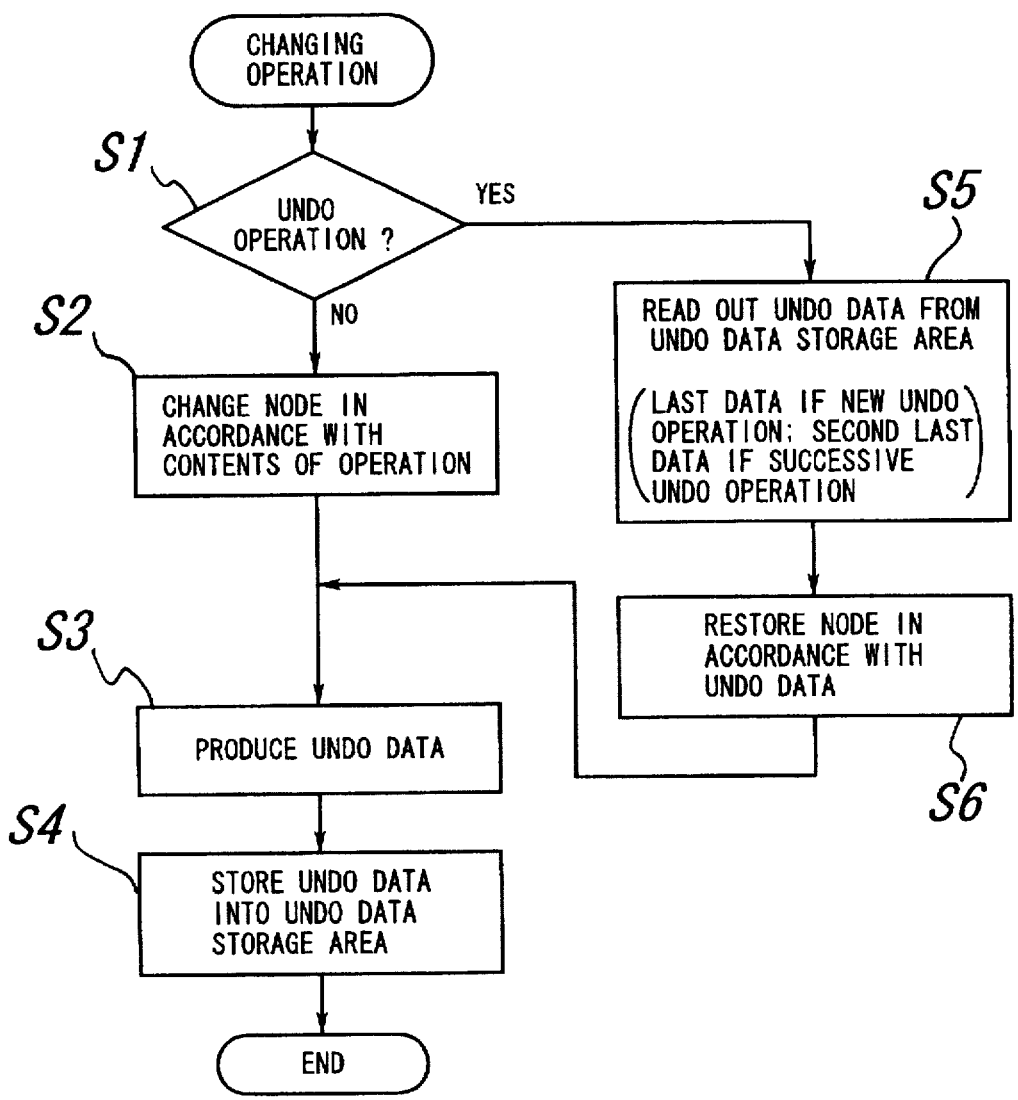
FIG. 2 is a flow chart illustrating a processing procedure of an undo method of the present invention by the hierarchical menu inquiry data editing system of FIGS. 1(a) and 1(b)
Figure 3A:
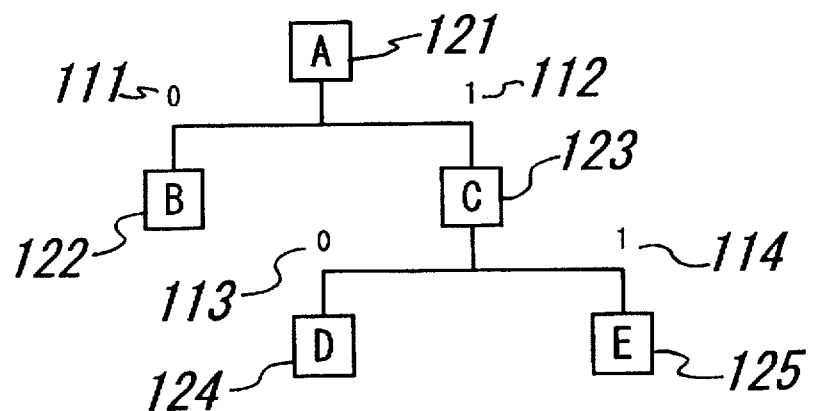
FIGS. 3(a), 3(b) and 3(c) are diagrammatic views illustrating a changing history of a tree structure.
Figure 3B:
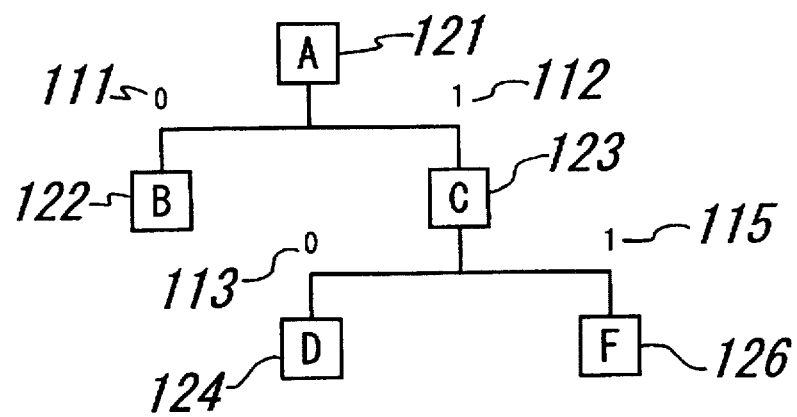
Figure 3C:
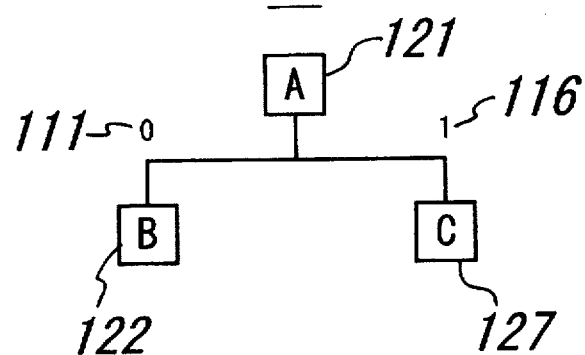

FIG. 2 is a flow chart illustrating the processing procedure of the undo method in the present embodiment. More particularly, description will be given of processing operation of an example wherein, similarly as described hereinabove in connection with the conventional method, for a tree structure 11 shown in FIG. 3(a), (1) a node E125 is changed for (replaced with) another node F126, and (2) a further node C123 is changed for (replaced with) a still further node G127, and then (3) an undo operation is performed (the node G is changed back for the node C), whereafter (4) another undo operation (to change the node F back for the node E) is performed successively so that the tree structure is successively changed from the tree structure 11 (FIG. 3(a)) to the tree structure 12 (FIG. 3(b)), the tree structure 13 (FIG. 3(c)), the tree structure 12 and the tree structure 11.

Figure 5:
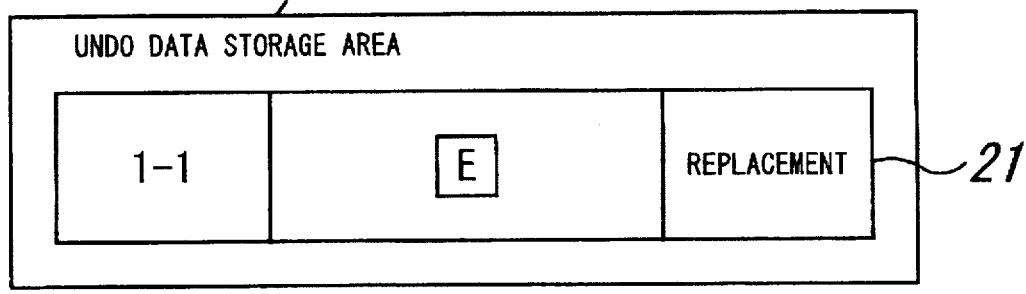
FIG. 5 is a diagrammatic view illustrating a stored condition of undo data in a memory when the tree structure is changed from that shown in FIG. 3(a) to that of FIG. 3(b) by the undo method of the present invention.

First, if the node E125 is changed for (replaced with) the node F126 by a menu selection, setting or changing operation at the node C123 of the tree structure 11 (N0 at step S1 in FIG. 2), then the entire tree structure 11 changes to the tree structure 12 (step S2). In this instance, such undo data 21 which include relative position data 211 of the node E125 on the tree structure, tree structure data 212 of a branch side (lower hierarchy side including the node itself) from the node E125 and operation type data 213 of a reverse operation type to that of the type of a changing operation having been performed at the node E125 are produced (step S3), and then stored into the undo data storage area 90 in the memory (step S4). A node relative position on the tree structure signifies a relative position of the node as viewed from the uppermost (root) node A121. Nodes of a same level (hierarchy) branched from a certain node have numbers of 0, 1, . . . , n allocated thereto as relative positions. In particular, the relative position 111 of the node B122 relative to the node A121 is "0" and the relative position 112 of the node C123 is "1", and the relative position 113 of the node D124 relative to the node C123 is "0" and the relative position 114 of the node E125 is "1". If the node F126 is replaced with the node E125, then the same number "1" is allocated to the relative position 115 of the node F126. Accordingly, the relative position data 211 of the node E125 is produced from the relative position 112 (=1) of the node C123 as viewed from the node A121 and the relative position 114 (=1) of the node E125 as viewed from the node C123, and is "1–1". Further, types of changing operations which may be performed by each node are "replacement", "addition" and "deletion", and types of reverse operations are "replacement", "deletion" and "addition", respectively. Accordingly, the reverse operation type data 213 in this instance is "replacement". As a result of the operations described above, the data storage condition of the undo data storage area 90 then is such as illustrated in FIG. 5.

Figure 4A:
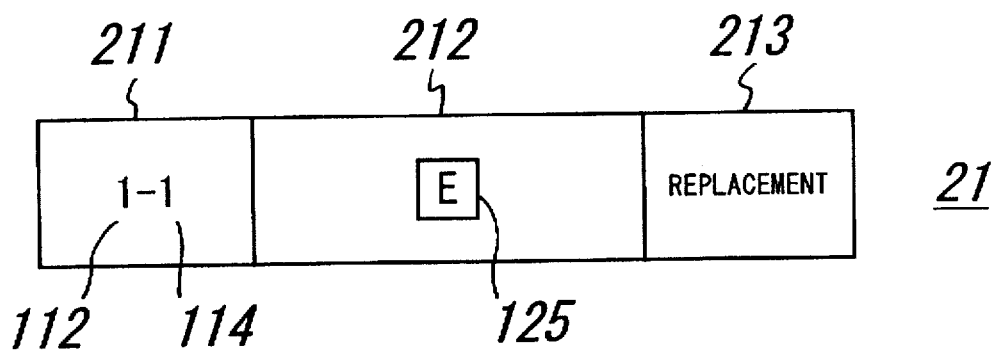
FIGS. 4(a), 4(b), 4(c) and 4(d) are diagrammatic views illustrating undo data in the tree structure changing history of FIGS. 3(a) to 3(c) by the undo method of the present invention.
Figure 4B:
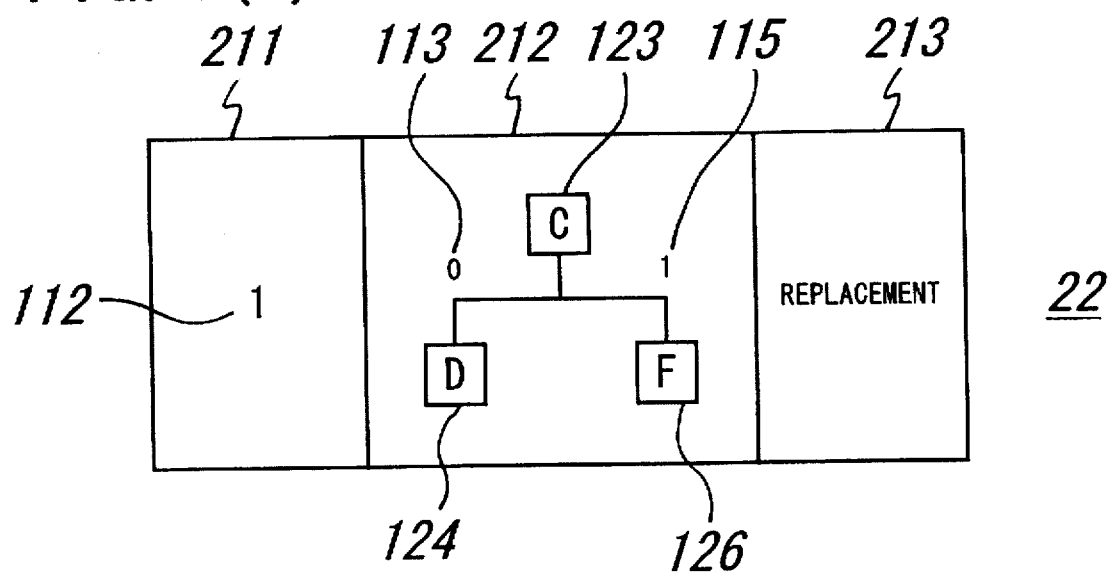

Subsequently, if the node C123 is changed for (replaced with) the node G127 by a menu selection, setting or changing operation at the node A121 of the tree structure 12, then the entire tree structure changes to the tree structure 13. The same number "1" as that of the node C123 is allocated to the relative position 116 of the node G127 relative to the node A121. Also in this instance, the undo data 22 shown in FIG. 4(b) are stored into the undo data storage area 90 similarly. Thus, the data storage condition of the undo data storage area 90 is such as shown in FIG. 6.

Figure 4C:
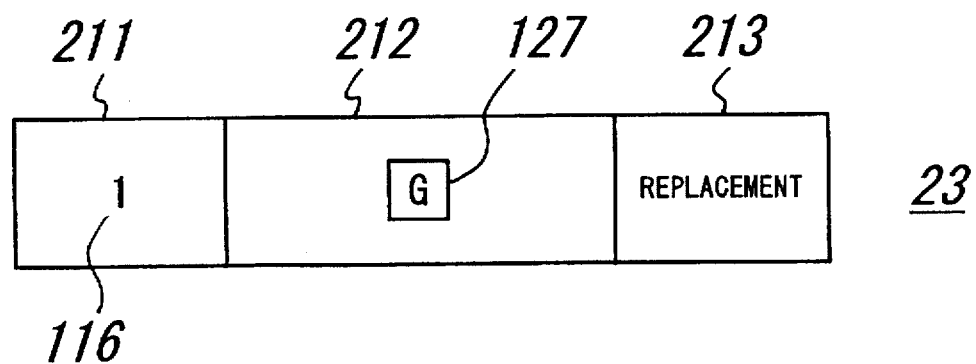
Figure 6:
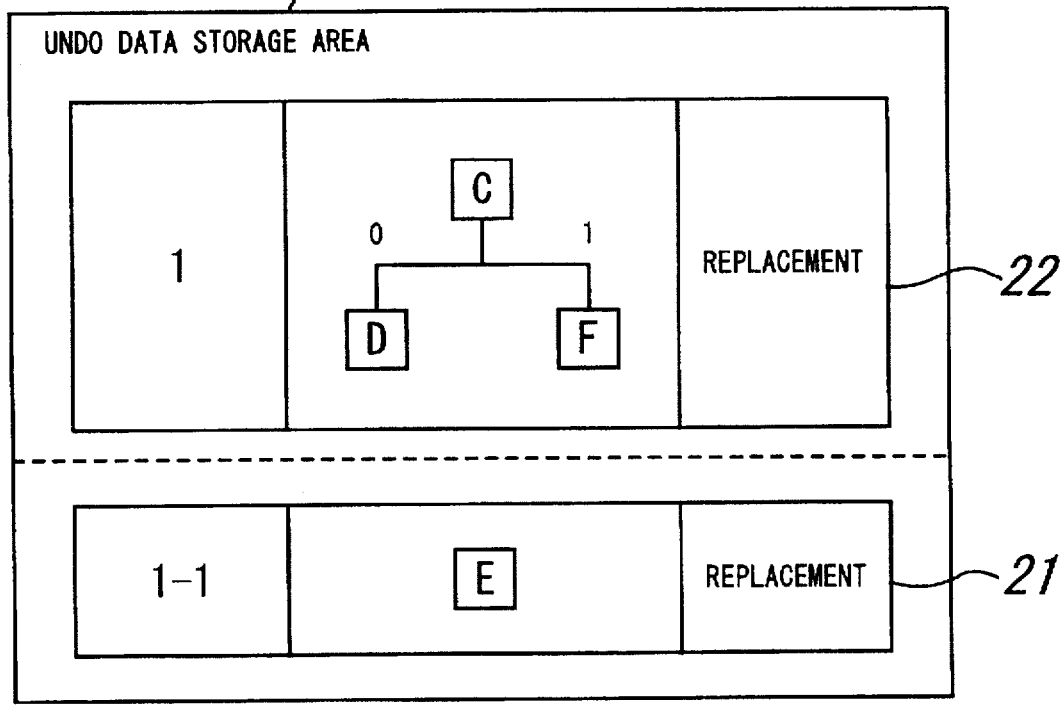
FIG. 6 is a diagrammatic view illustrating another stored condition of undo data in the memory in the condition illustrated in FIG. 5 when the tree structure is changed from that shown in FIG. 3(b) to that shown in FIG. 3(c)

If an undo operation of changing the node G127 back for the node C123 is performed (YES at step S1), then the uppermost undo data 22 of the undo data storage area 90 shown in FIG. 6 are read out (step S5). From the relative position data 211 (=1) of the uppermost undo data 22, the upper node (node A) to which the object node for operation is returned based on the result of the menu selection and setting and the position of the node (current node G) from which the object node for operation is returned are identified, and the tree structure is restored with the tree structure data 212 (nodes C, D, F) of the branch side and the reverse operation type data 213 (replacement) to the tree structure 12 (step S6). Also in this instance, the undo data 23 shown in FIG. 4(c) are stored into the undo data storage area 90 (steps S3 and S4). The data storage condition of the undo data storage area 90 is such as shown in FIG. 7.

Figure 4D:
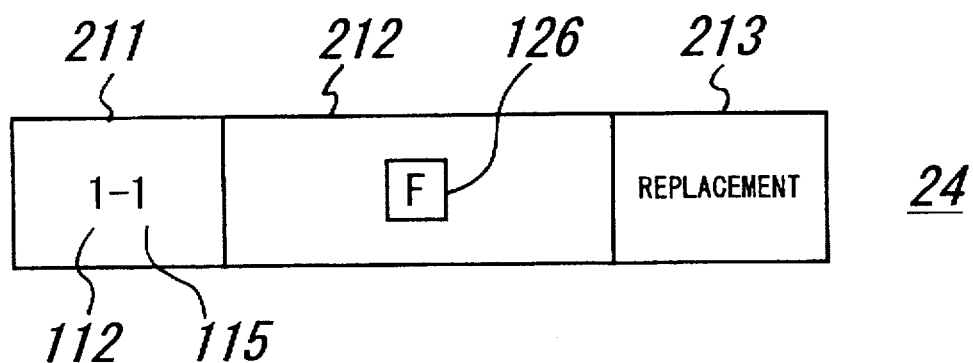
Figure 7:
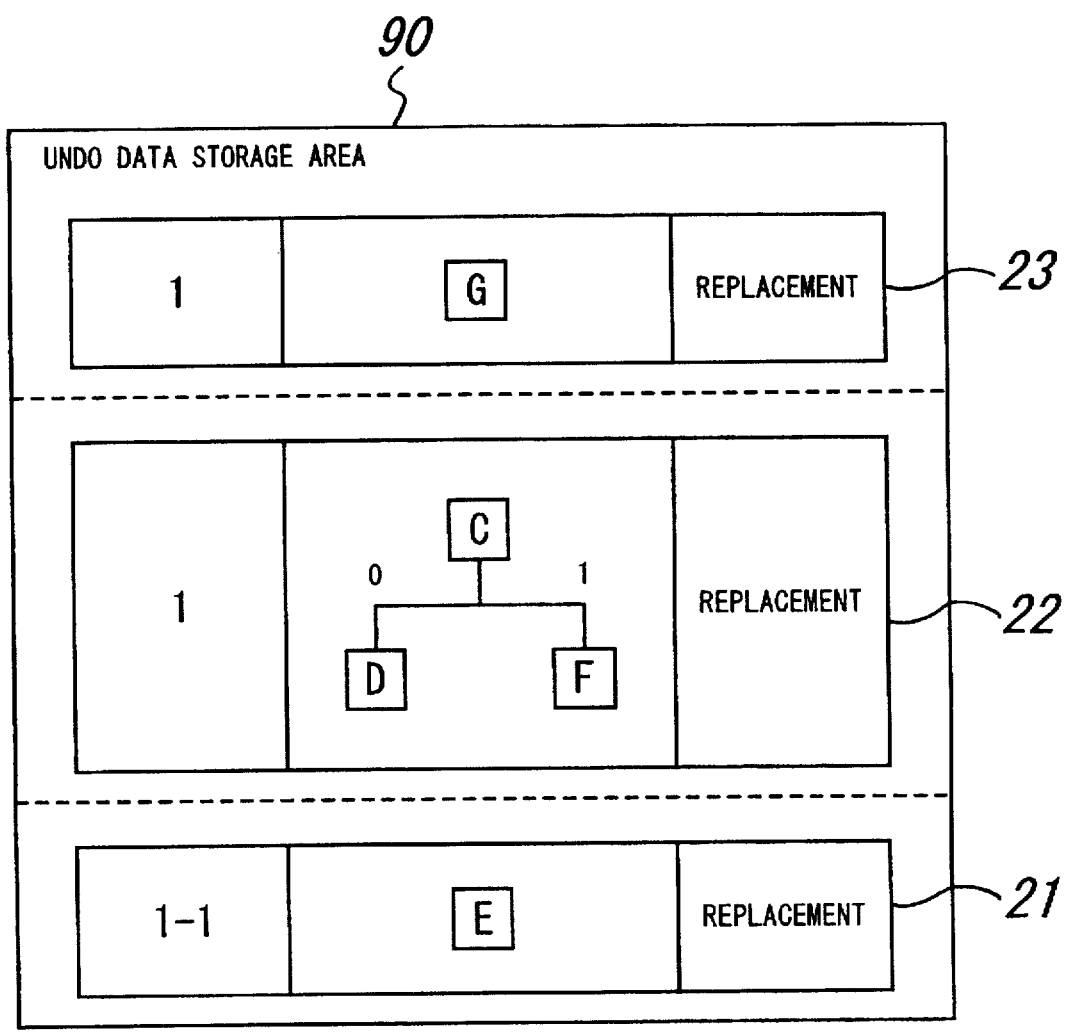
FIG. 7 is a diagrammatic view illustrating a further stored condition of undo data in the memory in the condition illustrated in FIG. 6 when the tree structure is changed back from that shown in FIG. 3(c) to that shown in FIG. 3(b)
Figure 8:
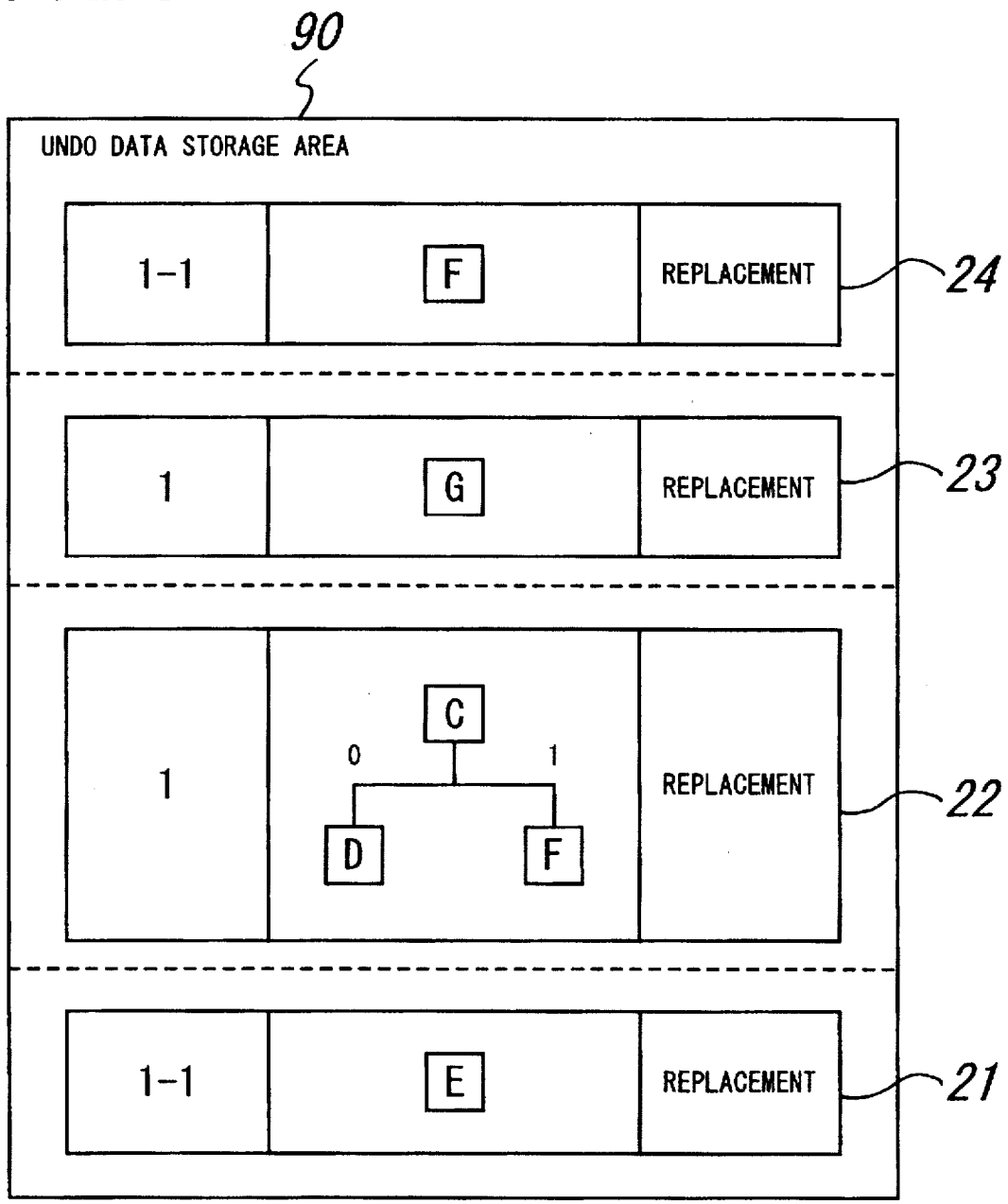
FIG. 8 is a diagrammatic view illustrating a still further stored condition of undo data in the memory in the condition illustrated in FIG. 7 when the tree structure is changed back from that shown in FIG. 3(b) to that shown in FIG. 3(a)

Further, if, in this instance, an undo operation of changing the node F126 of the tree structure 12 back for the node E125 is performed, then since this means that an undo operation is performed successively twice, the second last undo data 21 in FIG. 7 are read out by the processing at step S5. Then, from the relative position data 211 (=1−1) of the second last undo data 21, the upper node (node C) to which the object node for operation is returned based on the result of the menu selection and setting and the position of the node (current node F) from which the object node for operation is returned are identified, and the tree structure is restored to the original tree structure 11 with the tree structure data 212 (node E) of the branch side and the reverse operation type data 213 (replacement). Also in this instance, the undo data 24 illustrated in FIG. 4(d) are stored into the undo data storage area 90 similarly. The data storage condition of the undo data storage area 90 is such as illustrated in FIG. 8.

It is to be noted that, while, in the present method, information of the reverse operation types to the types of operations performed at nodes upon setting of the undo data 21 to 24 is set and the tree structure is restored in accordance with the thus set information, alternatively, information of a type of an operation performed at each node may be set as it is so that an operation reverse to that of the information may be performed to restore the tree structure.

As described above, in the undo method of the present invention, when an operation (changing of a node such as replacement, addition or deletion) different from a preceding operation is performed at any node by a menu operation, undo data of information of a relative position of a node on a tree structure, a tree structure on a branch side from the node and a reverse operation type to the type of an operation performed at the node are produced and stored into an undo data storage area so that the tree structure is restored using the undo data stored upon performance of an undo operation. Consequently, as the amount of tree structure data increases, the time required to store the undo data into the undo data storage area and the time required to restore the original tree structure data with the undo data which have been stored into the undo data storage area upon performance of an undo operation can be reduced. Further, as the amount of tree structure data increases, the amount of the undo data relative to the amount of the entire tree structure decreases, and consequently, the memory consumption can be reduced and the available range of an undo operation can be increased advantageously.

Subsequently, an example of a cancel/undo method of the present invention will be described.

Figure 9A:
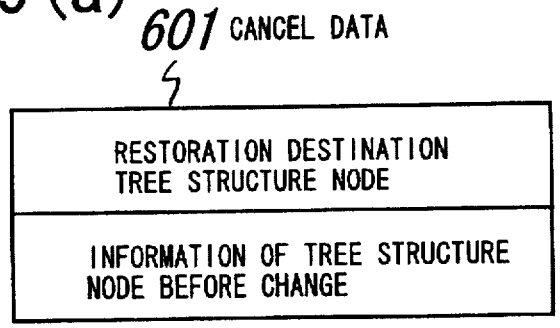
FIGS. 9(a), 9(b) and 9(c) are diagrammatic views showing constructions of cancel data, cancel type undo data and uncancel type undo data used in a cancel/undo method of the present invention, respectively.
Figure 9B:
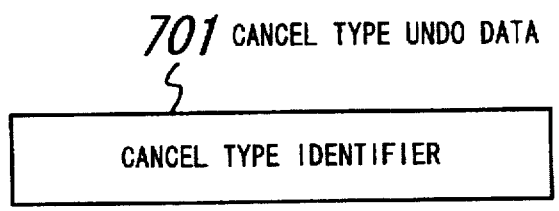
Figure 9C:
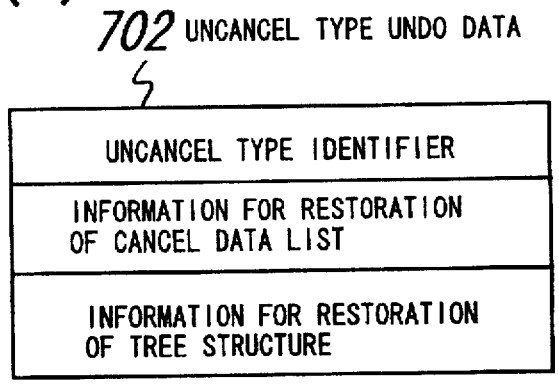

Constructions of cancel data 601, cancel type undo data 701 and uncancel type undo data 702 are illustrated in FIGS. 9(a), 9(b) and 9(c), respectively. The cancel data 601 has a "restoration destination tree structure node" and "information of tree structure nodes before change". However, the cancel data 601 may alternatively have a construction similar to that of the undo data (reference numerals 21 to 24 in FIGS. 4(a) to 4(d)) used in the undo method described hereinabove. In this instance, an upper node to a node position represented by the relative position data 211 makes the restoration destination tree structure node, and the node position represented by the relative position data 211, the tree structure data 212 and the operation type data 213 make the information of tree structure nodes before change. It is to be noted that the information of the reverse operation type data 213 then need not be obtained by reversal upon setting but may be obtained by reversal after reading out of information similarly as in the undo method described hereinabove. The cancel type undo data 701 has a "cancel type identifier". The uncancel type undo data 702 has an "uncancel type identifier", "information for restoration of the cancel data list" and "information for restoration of the tree structure".

Figure 10:
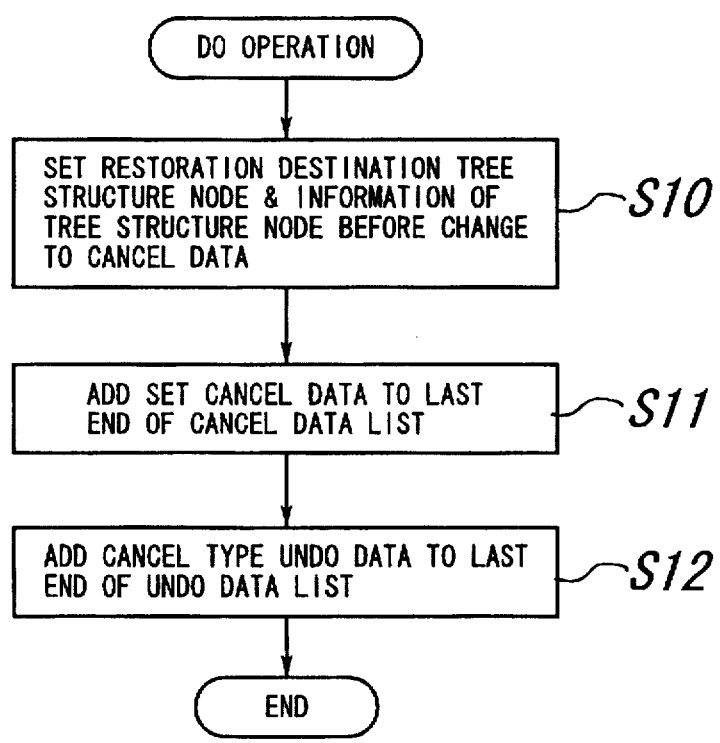
FIG. 10 is a flow chart illustrating a processing procedure of a cancel/undo method of the present invention upon do operation.

FIG. 10 is a flow chart illustrating a processing procedure of the do processing section 1060. The do processing section 1060 accesses, when an undo operation is performed in response to a menu inquiry, the memory 1100 by way of the data construction section 1090 and holds a "restoration destination tree structure node" and "information of tree structure nodes before change" (step S10). Then, the do processing section 1060 adds the cancel data to the last end of the cancel data list 600 (step S11) and then adds cancel type undo data to the last end of the undo data list 700 (step S12).

Figure 11:
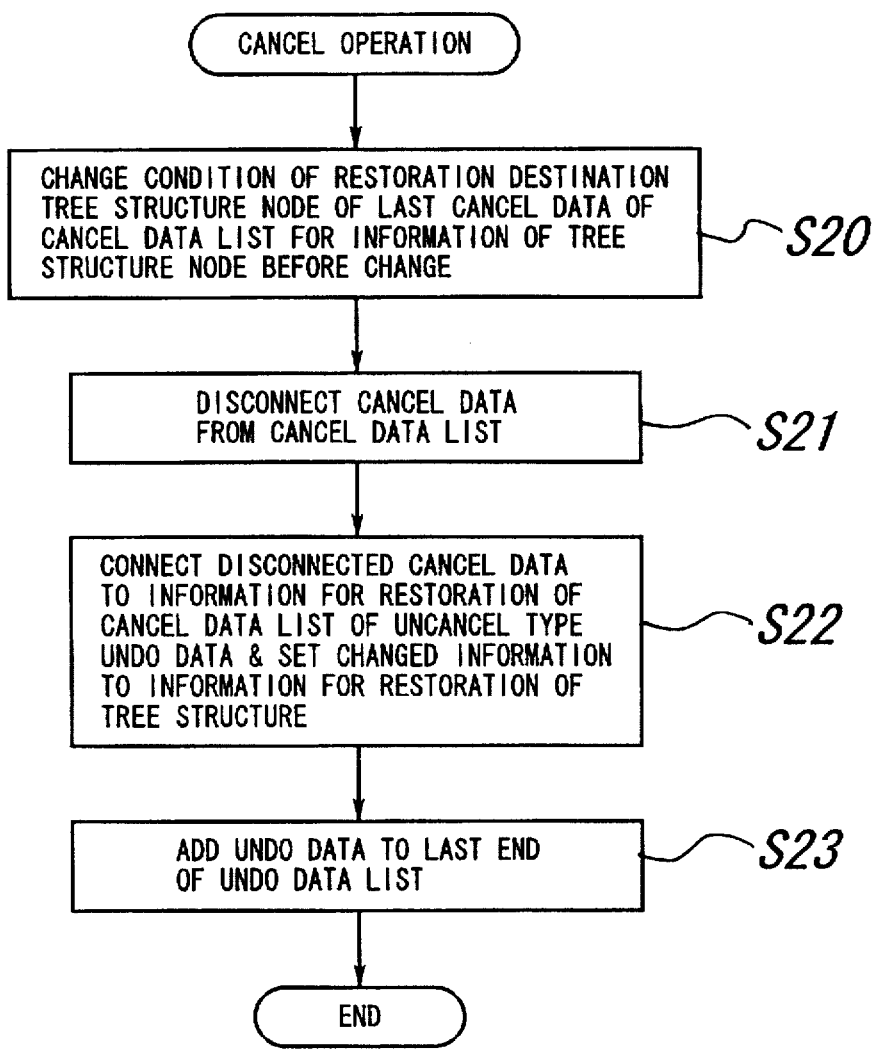
FIG. 11 is a flow chart illustrating a processing procedure of the form cancel/undo method upon cancel operation.

FIG. 11 is a flow chart illustrating a processing process of the cancel processing section 1070. The cancel processing section 1070 accesses, when a cancel operation is performed, the memory 1100 by way of the data construction section 1090 and restores the tree structure beginning with the node designated as the "restoration destination tree structure node" to that before change based on the last cancel data of the cancel data list 600 (step S20). Then, the cancel processing section 1070 are disconnected from the cancel data list 600 (step S21). Uncancel type undo data are prepared for undo data corresponding to the cancel operation, and to the "information for restoration of the cancel data list", the cancel data disconnected by the processing at step S21 are set while, for the "information for restoration of the tree structure", the information changed by the cancellation is set (step S22), and then the thus set information is added to the last end of the undo data list 44 (step S23).

Figure 12:
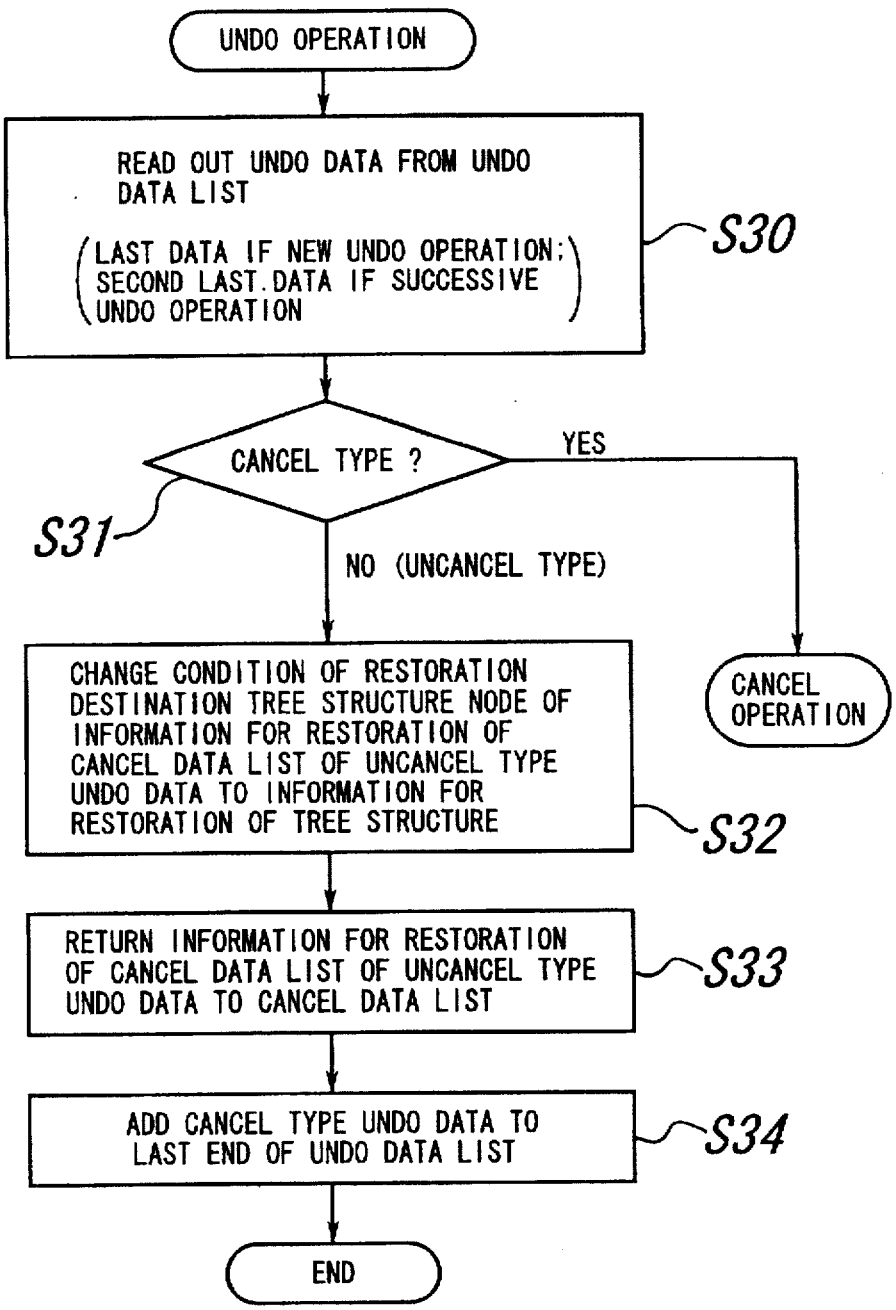
FIG. 12 is a flow chart illustrating a processing procedure of the cancel/undo method upon undo operation.

FIG. 12 is a flow chart illustrating a processing procedure of the undo processing section 1080. The undo processing section 1080 accesses, when an undo operation is performed, the memory 1100 by way of the data construction section 1090 to fetch one of undo data from the undo data list 700. In this instance, if the last operation is not an undo operation and an undo operation is to be performed newly, the last undo data are read out, but if the last operation is an undo operation and consequently another undo operation is to be performed successively, undo data just prior to undo data read out upon the last undo operation are read out (step S30). The type of the undo data thus read out is discriminated based on its identifier, and when the undo data are of the cancel type (Yes at step S31), the same processing as that performed upon a cancel operation is performed by the cancel type undo processing section 1081. On the other hand, when the undo data are of the uncancel type (NO at step S31), the tree structure is restored based on the "information for restoration of the tree structure" by the uncancel type undo processing section 1082 (step S32). Then, the cancel data set in the "information for restoration of the cancel data list" are returned into the cancel data list 600 (step S33). Finally, the undo data of the cancel type are added as undo data corresponding to the undo operation to the last end of the undo data list 700 (step S34).

It is to be noted that the cancel processing section 1070 and the undo processing section 1080 delete the first (oldest) undo data of the undo data list 700 if, when undo data are to be added to the undo data list 700, the total number of undo data stored in the undo data list 700 exceeds a maximum undo time number allowed by the system design.

Subsequently, a changing and restoring processing operation of tree structure data by the cancel/undo method of the present invention will be described in detail. As an example, description will be given of a case wherein the allowable maximum undo time number is 5 and, for the tree structure data (hereinafter referred to as tree structure) 501 of FIG. 13, a node C is changed for another node H on a menu of a further node B to obtain a tree structure 502 (FIG. 14) and a still further node E on the tree structure 502 is changed to a yet further node I on a menu of a yet further node D to obtain another tree structure 503 (FIG. 15), and a yet further node J on the tree structure 503 is set on a menu of the node I to obtain a further tree structure 504 (FIG. 16), whereafter the tree structure is successively restored to the tree structure 503, the tree structure 502 and the tree structure 503 by an undo operation (FIG. 17), a cancel 18) and n (FIG. 18) and another undo operation (FIG. 19), respectively.

Figure 13:
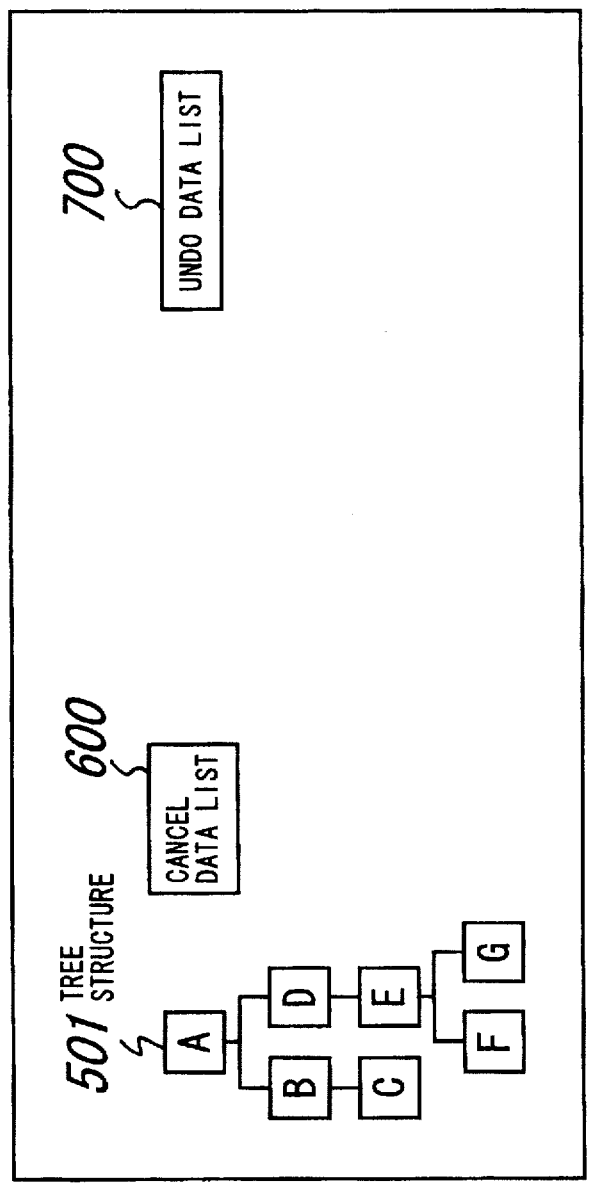
FIG. 13 is a diagrammatic view illustrating an example of an initial stored condition in the memory of tree structure data, cancel data and undo data by the cancel/undo method.
Figure 14:
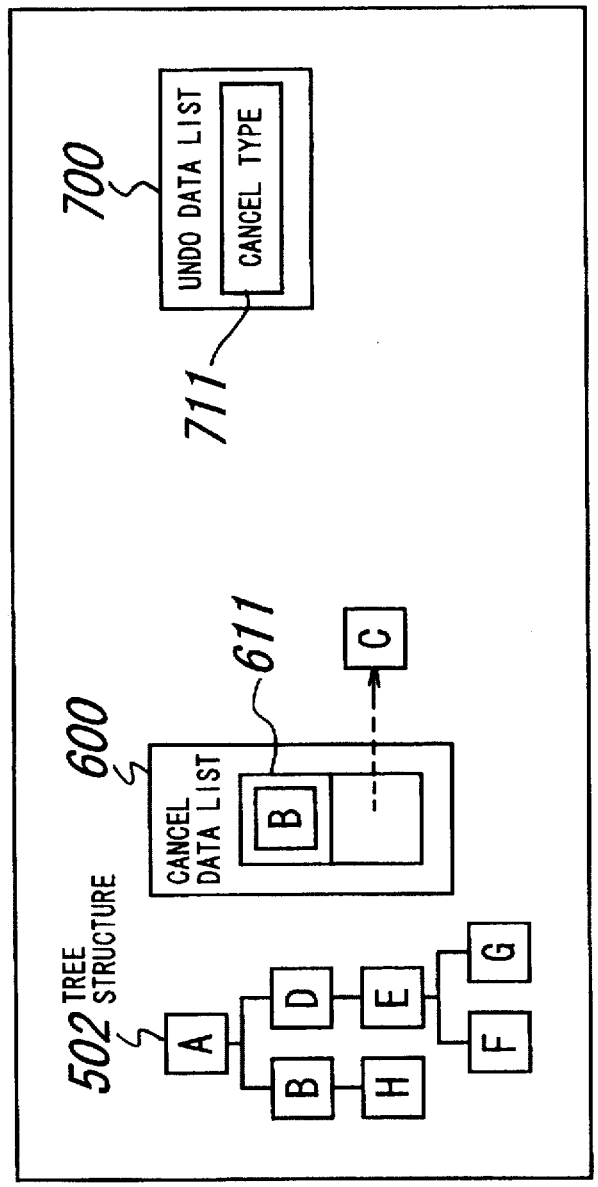
FIG. 14 is a similar view but illustrating a stored condition in the memory of tree structure data, cancel data and undo data when a node C is changed for another node H in FIG. 13.

Referring to FIG. 13, the cancel data list 600 and the undo data list 700 are individually in an initial state and have no data set therein. When the node C is changed for the node H on the menu of the node B of the tree structure 501 of FIG. 13, cancel data 611 is prepared; the node B is set as a restoration destination tree structure node; the node C is set as information of the node before change; and the thus prepared and set information is added to the cancel data list 600. Further, cancel type undo data 711 is added to the undo data list 700 (FIG. 14).

When the node E is changed for the node I on the menu of the node D of the tree structure 502 of FIG. 14, cancel data 612 is prepared; the node D is set as the restoration destination tree structure node; the node E as well as the node F and the node G just below the node E are set as the information of nodes before change; and the thus prepared and set information is added to the cancel data list 600. Further, cancel type undo data 712 are added to the undo data list 700 (FIG. 15).

Figure 15:
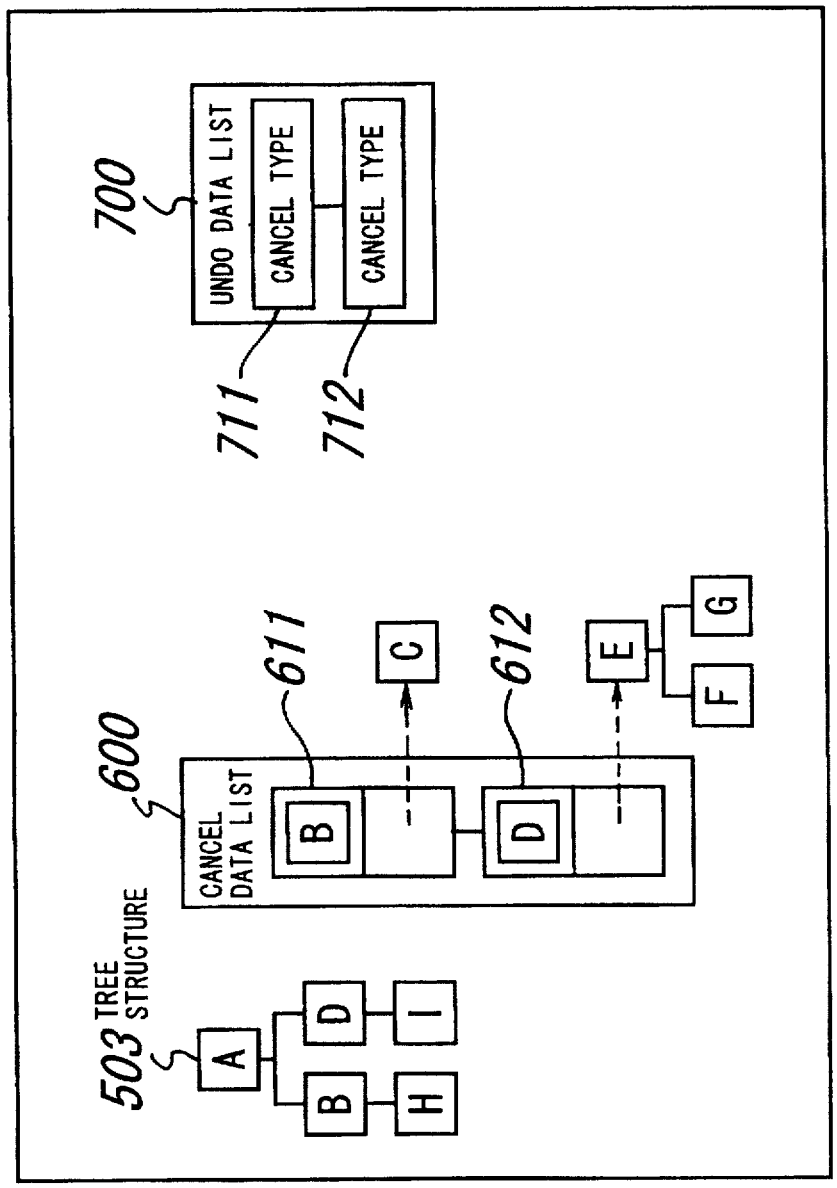
FIG. 15 is a similar view but illustrating a stored condition in the memory of tree structure data, cancel data and undo data when the node E is changed for a further node I in FIG. 14.

When the node J is set on the menu of the node I of the tree structure 503 of FIG. 15, cancel data 613 is prepared; the node I is set &s the restoration destination tree structure node; "none" is set as information of nodes before change; and the thus prepared and set information is added to the cancel data list 600. Further, cancel type undo data 713 is added to the undo data list 700 (FIG. 16).

Figure 16:
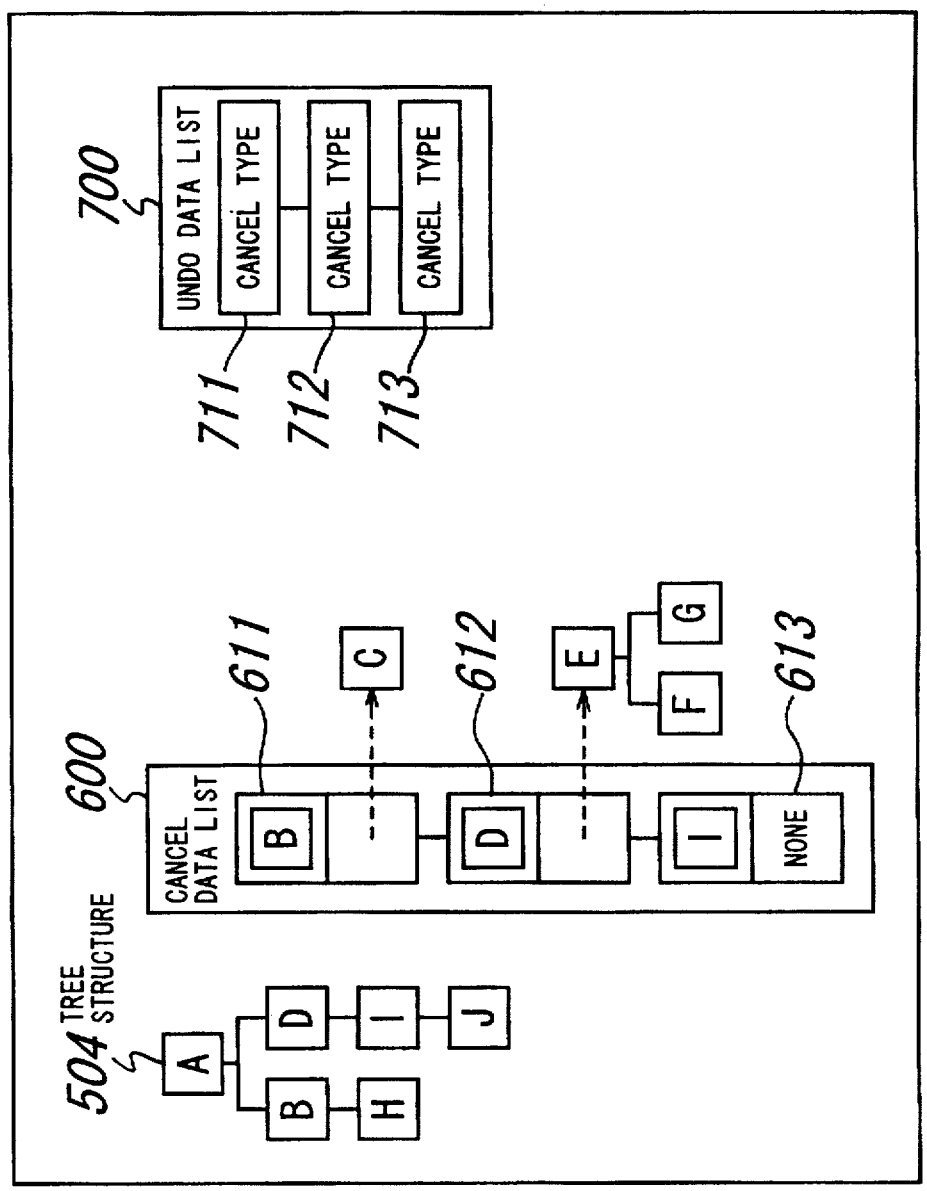
FIG. 16 is a similar view but illustrating a stored condition in the memory of tree structure data, cancel data and undo data when a still further node J is se to the node I in FIG. 15.

When &n undo operation is performed with the tree structure 504 of FIG. 16, since the last undo data of the undo data list 700 is the cancel type undo data 713, the restoration destination tree structure node of the last cancel data 613 of the cancel data list 600 is the node I and the information of nodes before change is "none", the node J is disconnected from the node I of the tree structure 504. Then, uncancel type undo data 714 is prepared, and the cancel data 613 is re-connected to the information for restoration of the cancel data list of the uncancel type undo data 714 while the disconnected node J is connected to the information for restoration of the tree structure (FIG. 17).

Figure 17:
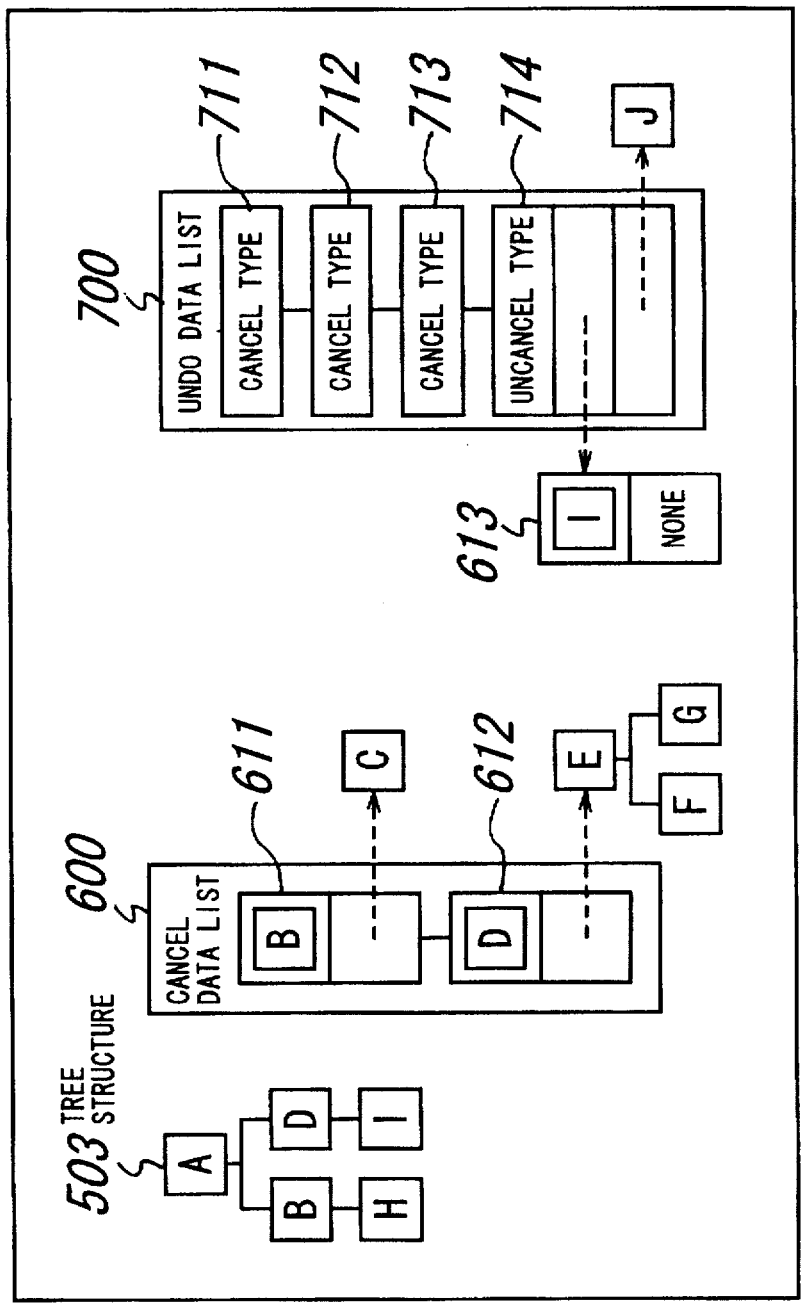
FIG. 17 is a similar view but illustrating a stored condition in the memory of tree structure data, cancel data and undo data when an undo operation is performed in the condition of FIG. 16.

When a cancel operation is performed with the tree structure 503 of FIG. 17, since the restoration destination tree structure node of the last cancel data 612 of the cancel data list 600 is the node D and the information of nodes before change is the nodes E, F and G, the node I is disconnected from the node D of the tree structure and connected to nodes beginning with the node E. Then, cancel type undo data 715 is prepared, and the cancel data 612 is re-connected to the information for restoration of the cancel data list of the undo data 715 while the disconnected node I is connected to the information for restoration of the tree structure (FIG. 18).

Figure 18:
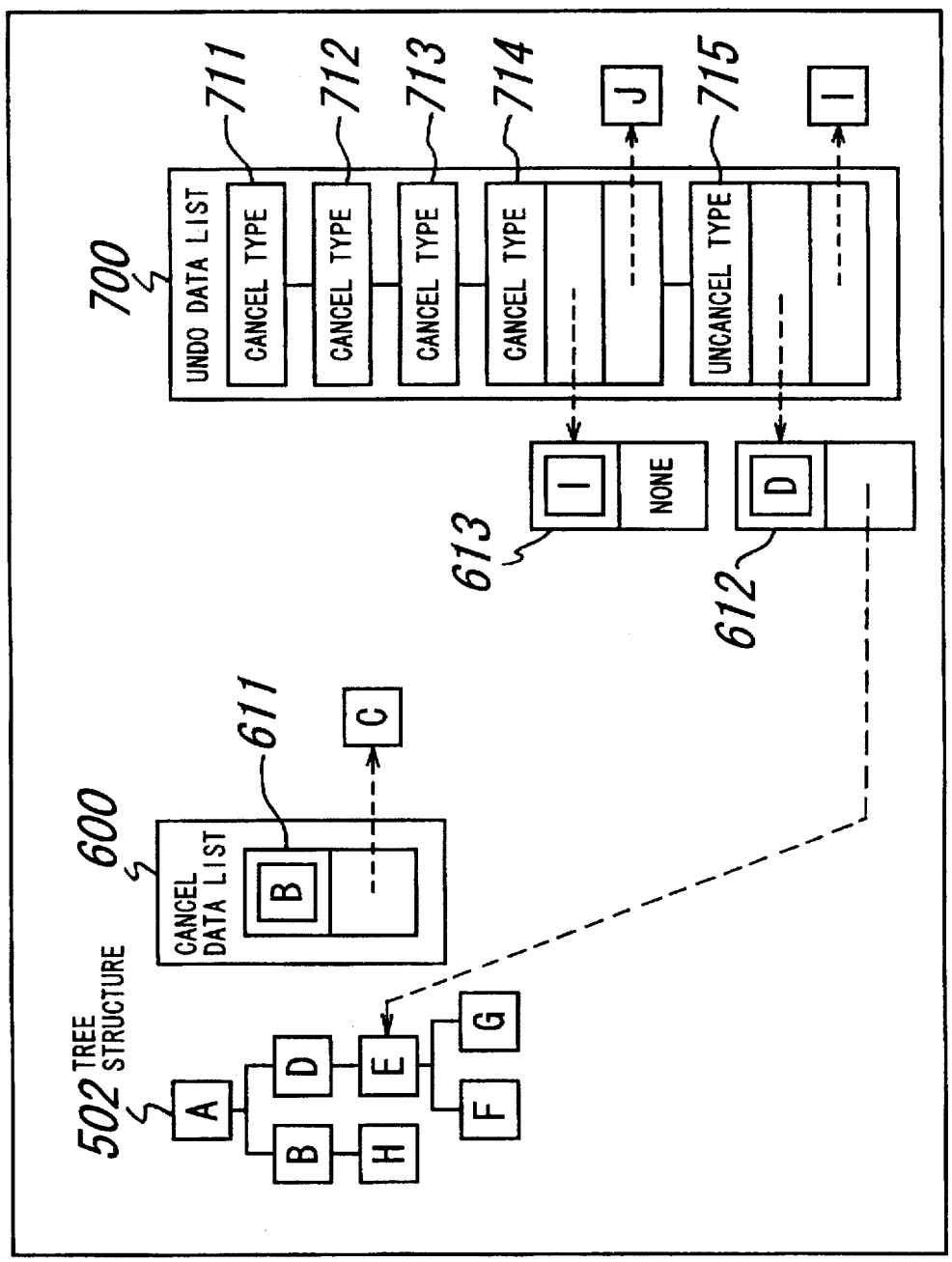
FIG. 18 is a similar view but illustrating a stored condition in the memory of tree structure data, cancel data and undo data when a cancel operation is performed in the condition of FIG. 17.
Figure 19:
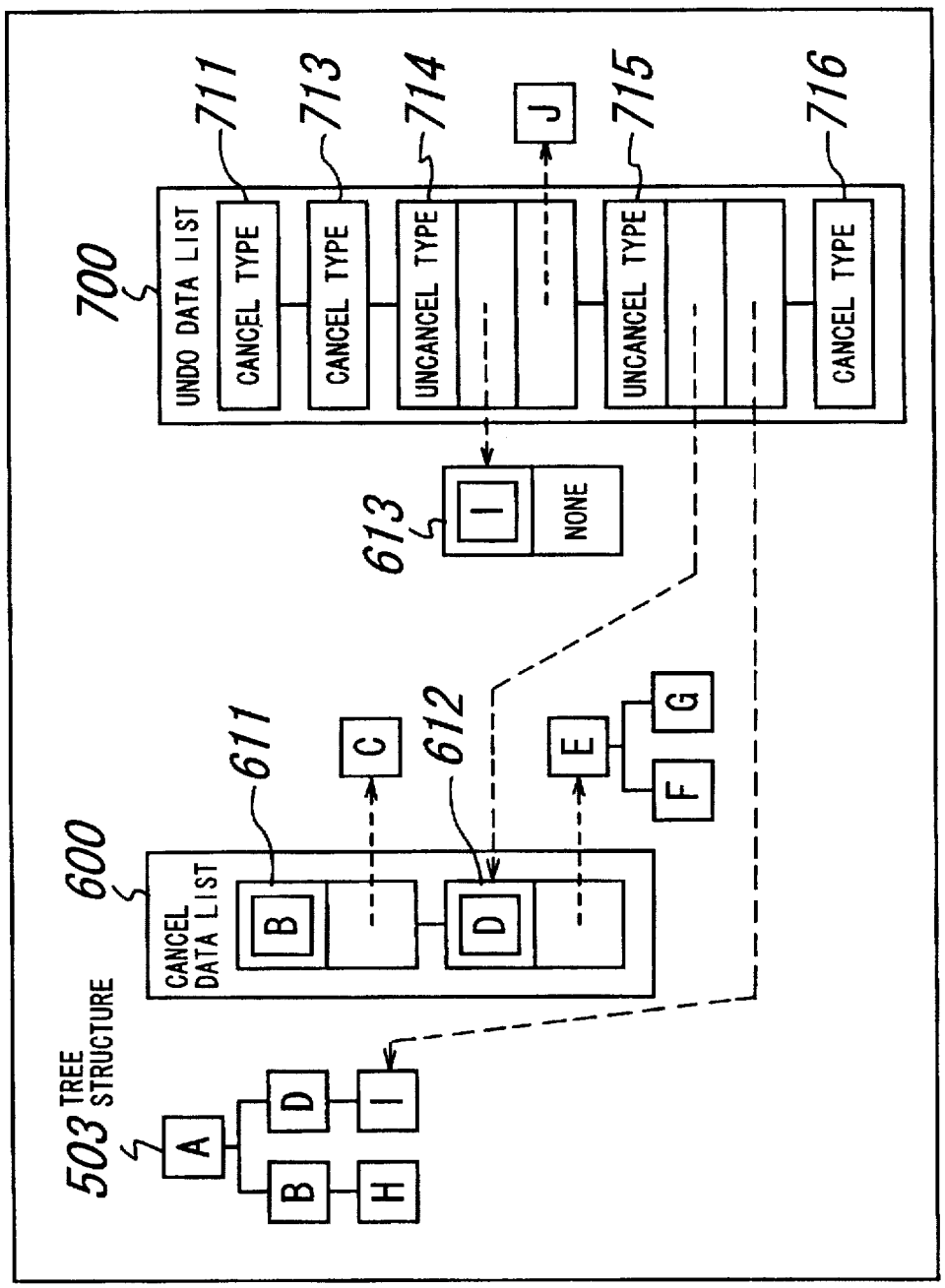
FIG. 19 is a similar view but illustrating a stored condition in the memory of tree structure data, cancel data and undo data when an undo operation is performed in the condition of FIG. 18.
Figure 20A:
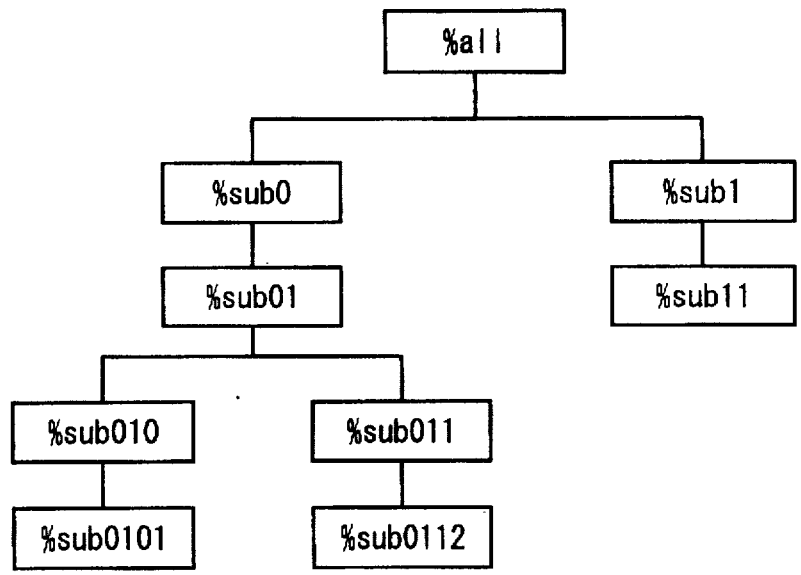
Figure 20B:
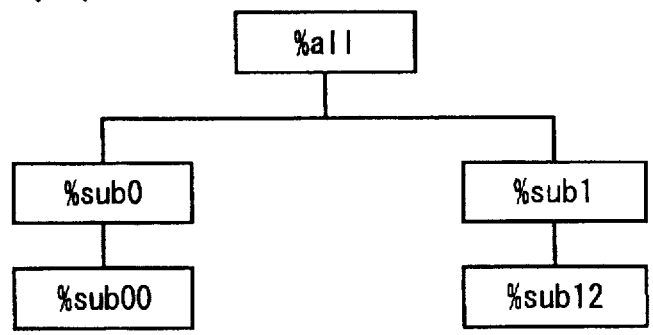
Figure 20C:
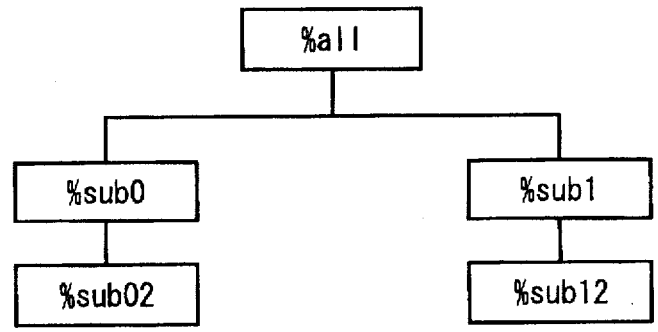
Figure 20D:
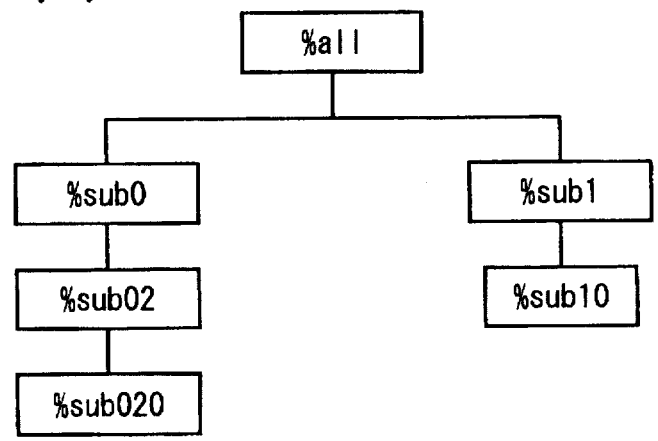
Figure 21:
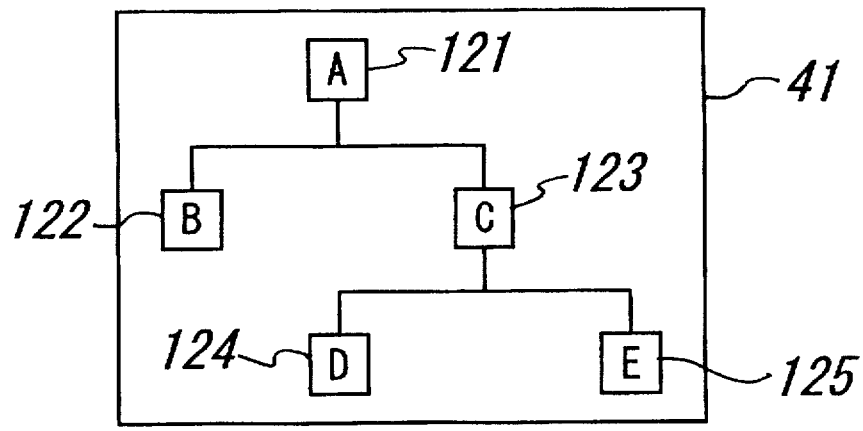
FIGS. 21(a), 21(b) and 21(c) are diagrammatic views illustrating undo data in the tree structure changing history of FIGS. 3(a), 3(b) and 3(c) by a conventional undo method.
Figure 21:
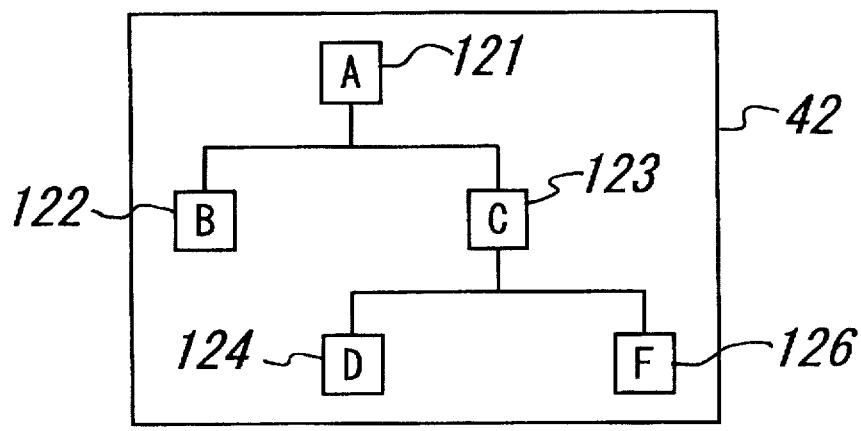
Figure 21:
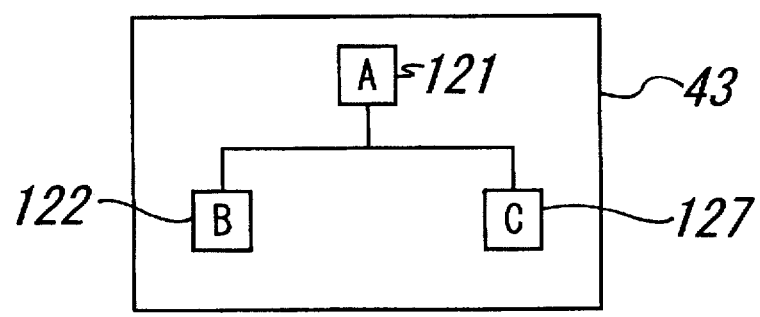
Figure 22:
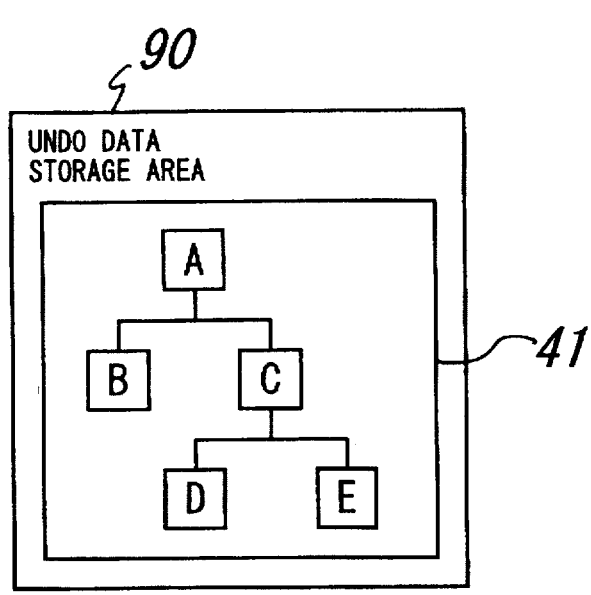
FIG. 22 is a diagrammatic view illustrating a stored condition of undo data in the memory when the tree structure is changed from that of FIG. 3(a) to that of FIG. 3(b) by the conventional undo method.
Figure 23:
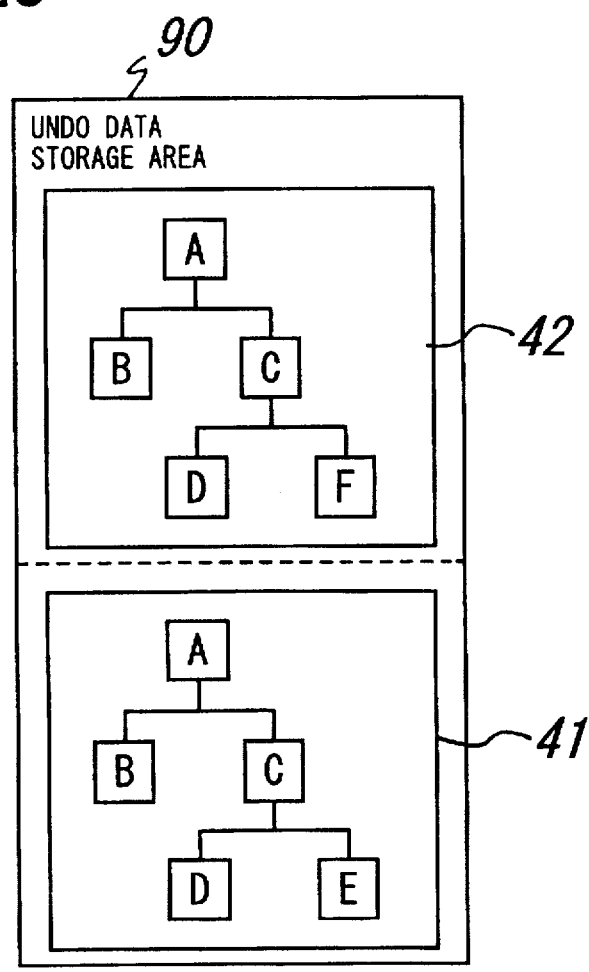
FIG. 23 is a similar view but illustrating a stored condition of undo data in the memory when the tree structure is changed from that of FIG. 3(b) to that of FIG. 3(c) in the condition of FIG. 22.
Figure 24:
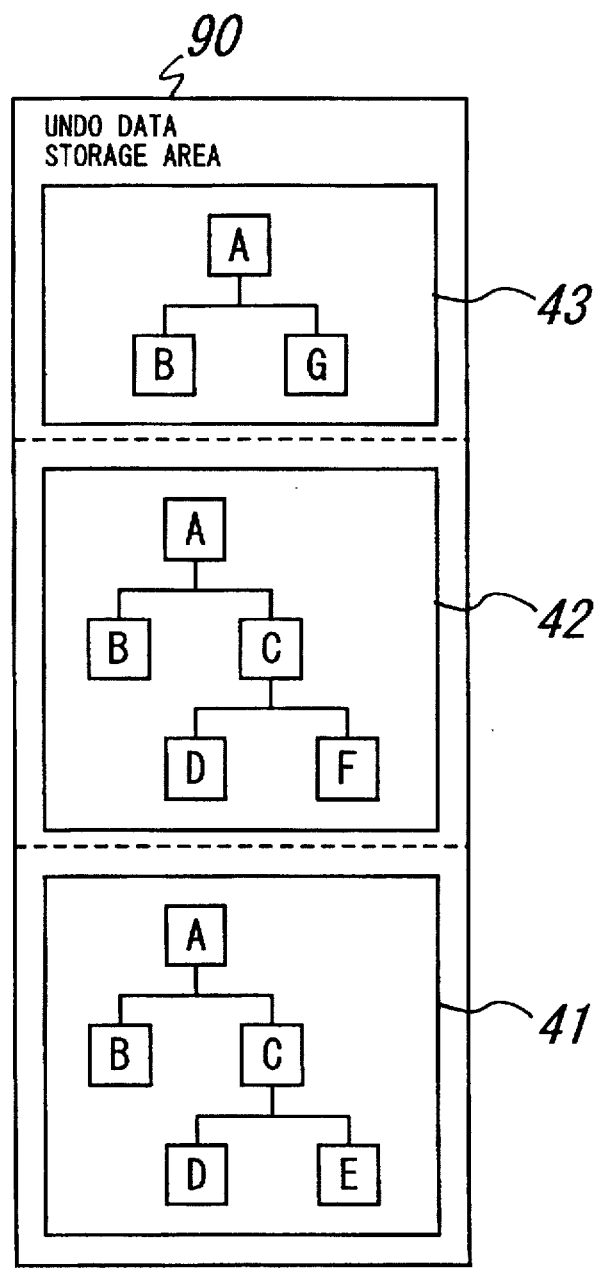
FIG. 24 is a similar view but illustrating a stored condition of undo data in the memory when the tree structure is changed from that of FIG. 3(c) back to that of FIG. 3(b) in the condition of FIG. 23.
Figure 25:
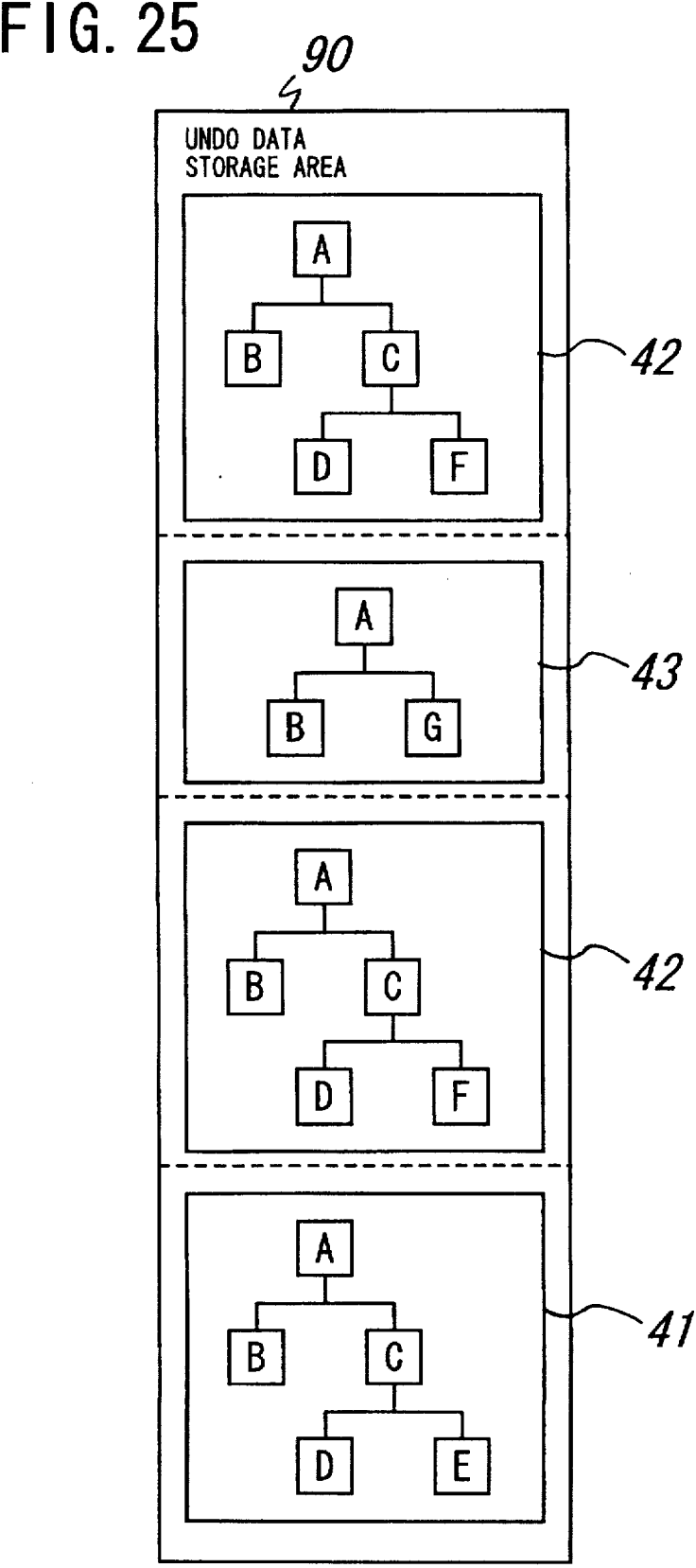
FIG. 25 is a similar view but illustrating a stored condition of undo data in the memory when the tree structure is changed from that of FIG. 3(b) back to that of FIG. 3(b) in the condition of FIG. 24.

When an undo operation is performed with the tree structure 502 of FIG. 18, since the last undo data of the undo data list 700 are the cancel type undo data 715, the restoration destination tree structure node of the cancel data 612 of the information for restoration of the cancel data list of the cancel type undo data 715 is the node D and the information for restoration of the tree structure of the cancel type undo data 715 is the node I, and consequently, the node E is disconnected form the node D of the tree structure 502 and the node I is connected to the node D. Then, the cancel data 612 of the information for restoration of the cancel data list of the cancel type undo data 715 are re-connected to the cancel data list 600. Here, since the allowable maximum undo time number is 5, the first or oldest cancel type undo data 711 of the undo data list 700 are deleted so that the number of undo data may not exceed the allowable maximum undo time timer (FIG. 19).

As described above, with the cancel/undo method described above, since the cancel data and the undo data are used commonly while the cancel data list and the undo data list are provided separately, the memory consumption and the processing time can be reduced remarkably.

Having now fully described the invention, it will be apparent to one of ordinary skill in the art that many changes and modifications can be made thereto without departing from the spirit and scope of the invention as set forth herein.

What is claimed is:

1. An undo method for restoring, in a hierarchical menu inquiry data edition system which has a plurality of unit data whose hierarchical connection conditions between them are defined and includes menu inquiry means for displaying a menu of objects of selection and/or setting by a user and accepting a response of the user, tree structure data construction means for successively determining and connecting those of the plurality of unit data to be connected in accordance with corresponding ones of the connection conditions beginning with an uppermost one of the plurality of unit data in response to responses of the user accepted by way of said menu inquiry means to dynamically construct tree structure data wherein each of the unit data serves as a node of the tree structure, and a memory for storing data including a tree structure changed by a change of any of the nodes, the undo method comprising the steps of:

producing undo data, when a changing operation is performed for an object one of the nodes for changing and the tree structure is changed, the undo data including information of a relative position of the changing object node on the tree structure, a partial tree structure including the changing object node and the nodes which belong to the changing object node, and a type of an operation reverse to that of the changing operation performed for the changing object node;

storing the produced undo data in said memory;

reading out, when an undo operation is performed, the undo data stored in said memory; and restoring and resetting the tree structure based on the read out undo data.

2. A cancel/undo method for restoring, in a hierarchical menu inquiry data edition system which has a plurality of unit data whose hierarchical connection conditions between them are defined and includes menu inquiry means for displaying a menu of objects of selection and/or setting by a user and accepting a response of the user, tree structure data construction means for successively determining and connecting those of the plurality of unit data to be connected in accordance with corresponding ones of the connection conditions beginning with an uppermost one of the plurality of unit data in response to responses of the user accepted by way of said menu inquiry means to dynamically construct tree structure data wherein each of the unit data serves as a node of the tree structure, and a memory for storing data, a tree structure changed by a change of any of the nodes, the undo method comprising the steps of:

preparing a cancel data list for storing cancel data and an undo data list for storing undo data in said memory in advance and determining to provide, for each of the undo data, an identifier for identifying whether the undo data is of a cancel type or of an uncancel type;

producing, upon do operation of changing a tree structure by selection or setting of a menu for any of the nodes and displaying a menu for a node of a lower hierarchy or a node of a next branch in the same hierarchy, cancel data including information of a restoration destination node position and a partial tree structure before the change, adding the cancel data to the last end of said cancel data list and adding cancel type undo data to the last end of said undo data list;

disconnecting, upon cancel operation of restoring a tree structure for an upper hierarchy node or a node of a preceding branch on the same hierarchy, the last cancel data from said cancel data list, restoring the tree structure to that before the change based on the thus disconnected cancel data, producing uncancel type undo data including information of the cancel data disconnected from said cancel data list and a partial tree structure changed by the cancel operation as undo data for the cancel operation, and adding the uncancel type undo data to the last end of said undo data list;

discriminating, upon undo operation of restoring the tree structure to that of a node changed last, whether the undo operation has been performed immediately subsequently to the last undo operation, and reading out, when the last operation is not an undo operation, the last undo data of said undo data list, but reading out, when also the last operation is an undo operation, the undo data just prior to the undo data read out upon the last undo operation of said undo data list; and discriminating a type of the thus read out undo data based on the identifier of the undo data, performing the same processing as the processing performed upon the cancel operation when the read out undo data is cancel type undo data, but restoring the tree structure based on the information when the read out undo data is uncancel type undo data, returning the cancel data disconnected from said cancel data list to said cancel data list, and adding the cancel type undo data as undo data corresponding to the undo operation to the last end of said undo data list.

3. A hierarchical menu inquiry data edition system, comprising:

a memory for storing data including a plurality of unit data whose hierarchical connection conditions between them are defined;

menu inquiry means for displaying a menu of objects of selection and/or setting by a user and accepting a response of the user;

tree structure data construction means for successively determining and connecting those of the plurality of unit data to be connected in accordance with corresponding ones of the connection conditions beginning with an uppermost one of the plurality of unit data in response to responses of the user accepted by way of said menu inquiry means to dynamically construct tree structure data wherein each of the unit data serves as a node of the tree structure;

said hierarchical menu inquiry data edition system being operable to restore a tree structure changed by a change of any of the nodes;

said memory having a cancel data list for storing cancel data and an undo data list for storing undo data;

do processing means operable under the control of said menu inquiry means for producing, when a do operation of changing a tree structure by selection or setting of a menu for any of the nodes and displaying a menu for a node of a lower hierarchy or a node of a next branch in the same hierarchy, cancel data including information of a restoration destination node position and a partial tree structure before the change, adding the cancel data to the last end of said cancel data list and adding cancel type undo data having an identifier indicative of a cancel type to the last end of said undo data list;

cancel processing means operable under the control of said menu inquiry means for disconnecting, when a cancel operation of restoring a tree structure for an upper hierarchy node or a node of a preceding branch on the same hierarchy is detected, the last cancel data from said cancel data list, restoring the tree structure to that before the change based on the thus disconnected cancel data, producing uncancel type undo data including information of the cancel data disconnected from said cancel data list and a partial tree structure changed by the cancel operation as undo data for the cancel operation and having an identifier indicating the uncancel type, and adding the thus produced uncancel type undo data to the last end of said undo data list; and undo processing means operable under the control of said menu inquiry means for discriminating, when an undo operation of restoring the tree structure to that for a node changed last, whether the undo operation has been performed immediately subsequently to the last undo operation, reading out, when the last operation is not an undo operation, the last undo data of said undo data list, but reading out, when also the last operation is an undo operation, the undo data just prior to the undo data read out upon the last undo operation of said undo data list, discriminating a type of the thus read out undo data based on the identifier of the undo data, performing the same processing as the processing performed upon the cancel operation when the read out undo data is cancel type undo data, but restoring the tree structure based on the information when the read out undo data is uncancel type undo data, returning the cancel data disconnected from said cancel data list to said cancel data list, and adding the cancel type undo data as undo data corresponding to the undo operation to the last end of said undo data list.

* * * * *